US011822429B2

(12) United States Patent
Desai et al.

(10) Patent No.: US 11,822,429 B2
(45) Date of Patent: Nov. 21, 2023

(54) STORAGE DEVICE RAID DATA WRITE INTERMEDIATE PARITY SYSTEM

(71) Applicant: Dell Products L.P., Round Rock, TX (US)

(72) Inventors: Girish Desai, Fremont, CA (US); Frederick K. H. Lee, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/716,204

(22) Filed: Apr. 8, 2022

(65) Prior Publication Data

US 2023/0325278 A1   Oct. 12, 2023

(51) Int. Cl.
*G06F 11/10* (2006.01)
*G06F 11/07* (2006.01)
*G06F 3/06* (2006.01)
*G06F 1/30* (2006.01)

(52) U.S. Cl.
CPC ............ *G06F 11/1076* (2013.01); *G06F 1/30* (2013.01); *G06F 3/0619* (2013.01); *G06F 3/0652* (2013.01); *G06F 3/0689* (2013.01); *G06F 11/0772* (2013.01)

(58) Field of Classification Search
CPC ........................... G06F 11/1076; G06F 11/108
USPC ............................................... 714/6.22, 6.24
See application file for complete search history.

(56) References Cited

U.S. PATENT DOCUMENTS

| 2014/0372667 | A1* | 12/2014 | Tan ...................... G06F 11/1048 711/103 |
| 2018/0129451 | A1* | 5/2018 | Park ........................ G06F 11/10 |
| 2019/0073265 | A1 | 3/2019 | Brennan et al. |
| 2020/0210282 | A1 | 7/2020 | Cariello |
| 2021/0096767 | A1* | 4/2021 | Kotzur .................. G06F 3/0689 |
| 2021/0191808 | A1* | 6/2021 | Bhardwaj ............. G06F 11/108 |

FOREIGN PATENT DOCUMENTS

EP    2942713 A1 * 11/2015 ............ G06F 11/108

OTHER PUBLICATIONS

International Search Report and Written Opinion mailed in International Application No. PCT/US2023/060606 dated May 10, 2023, 10 pages.

* cited by examiner

*Primary Examiner* — Chae M Ko
(74) *Attorney, Agent, or Firm* — Joseph Mencher

(57) ABSTRACT

A storage device RAID data write intermediate parity system includes a storage device coupled to a host system and including a storage subsystem and a volatile memory system. The storage device RAID data write intermediate parity system receives first primary data from the host system, and stores the first primary data in the volatile memory system. The storage device RAID data write intermediate parity system then stores a first subset of the first primary data in the storage system, generates first intermediate parity data using the first subset of the first primary data, stores the first intermediate parity data in the volatile memory system and, in response, erases the first subset of the first primary data from the volatile memory system.

20 Claims, 28 Drawing Sheets

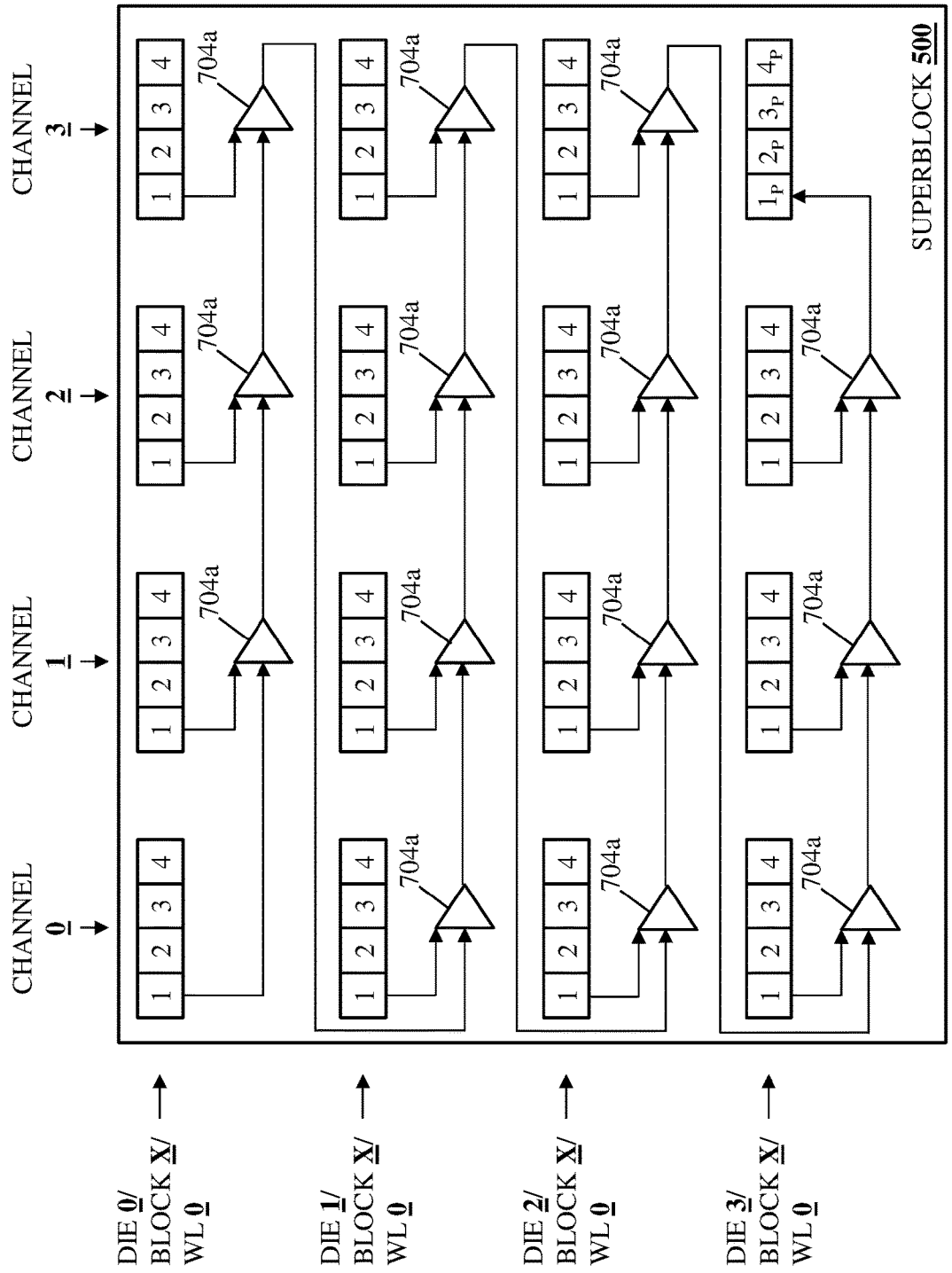
(PRIOR ART) FIG. 7C

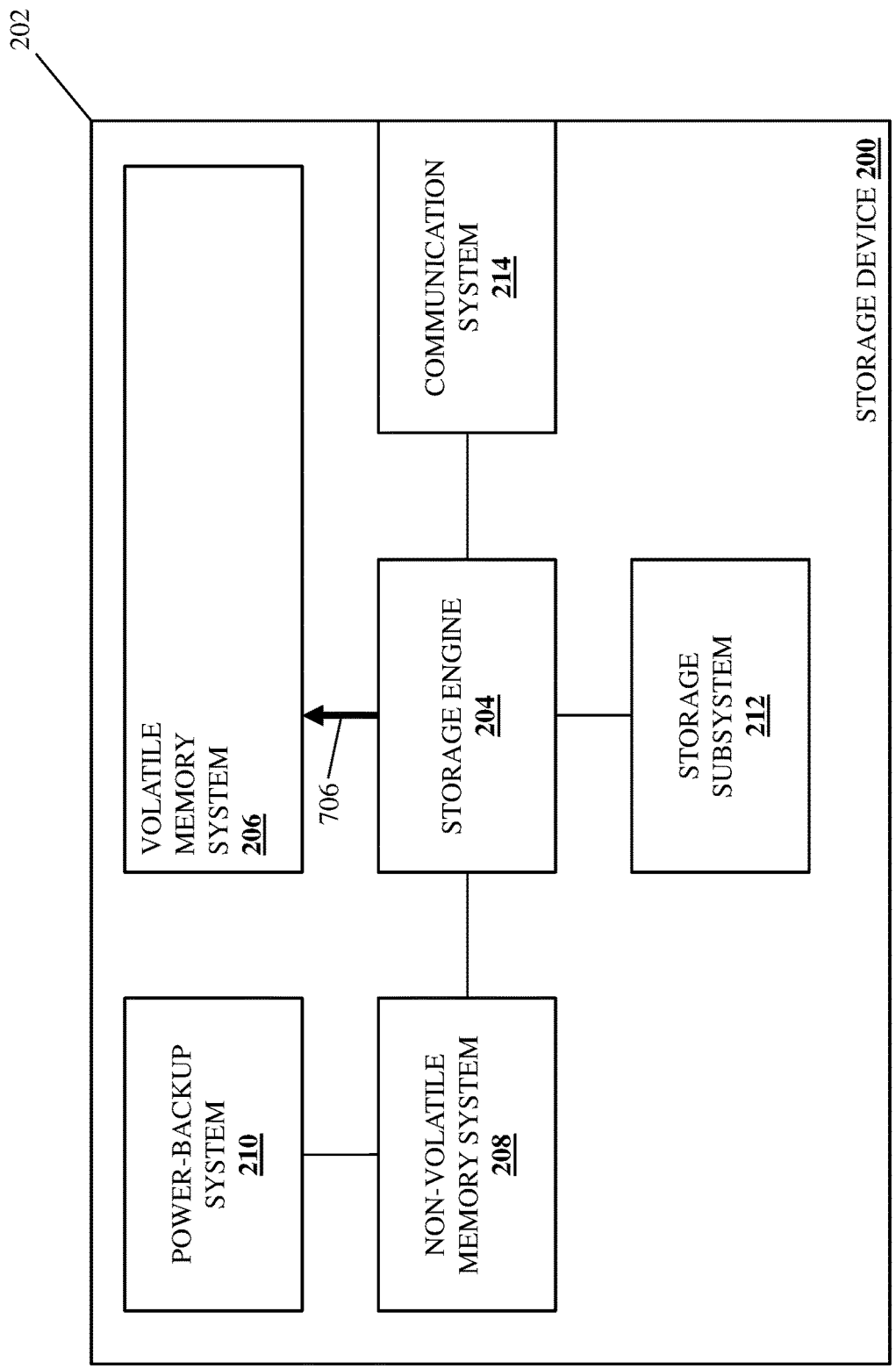
(PRIOR ART) FIG. 7D

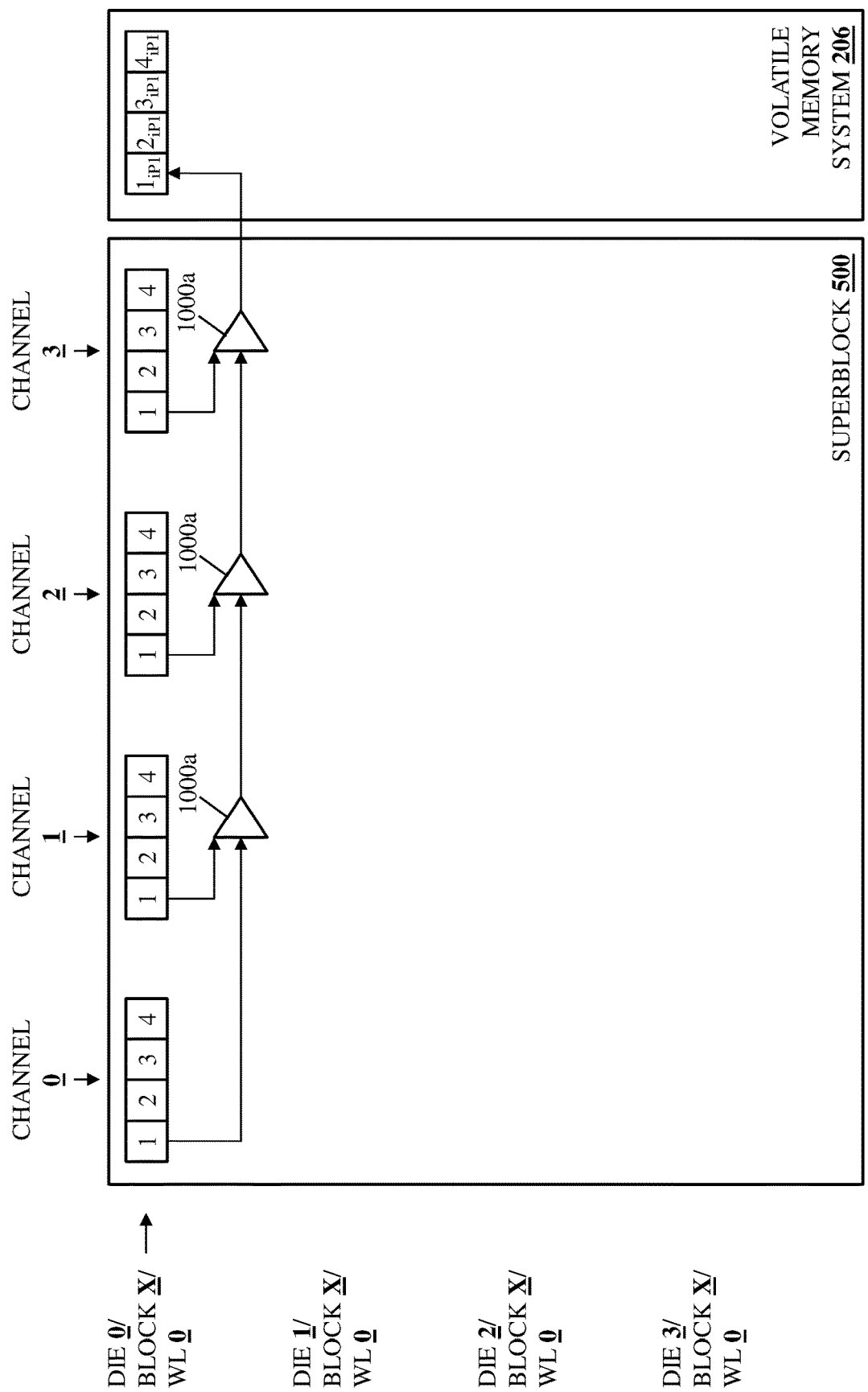

STORAGE DEVICE RAID DATA WRITE INTERMEDIATE PARITY SYSTEM

BACKGROUND

The present disclosure relates generally to information handling systems, and more particularly to utilizing intermediate parity data for Redundant Array of Independent Disk (RAID) data writes in storage devices used in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Storage devices such as, for example, Solid State Drive (SSD) storage devices used in server devices and/or other computing devices known in the art, often utilize Redundant Array of Independent Disk (RAID) techniques for protecting data written to storage subsystems in those storage devices. For example, RAIDS techniques provide for the generation and storage of parity data with "primary" data (e.g., which includes data provided by a host for storage) that is written to a storage subsystem in a storage device, and one of skill in the art in possession of the present disclosure will appreciate how, in the event a portion of the primary data written to the storage subsystem in the storage device is not recoverable, the portions of the primary data that are recoverable and its corresponding parity data may be used to reconstruct the portion of the primary data that is not recoverable. However, due the possibility of write errors, power loss, or other issues that may occur during the writing of primary data to storage subsystems in storage devices, conventional storage devices operate to store the primary data (and any associated data/metadata) in their volatile memory systems (e.g., in buffers) until all the primary data and its corresponding parity data have been successfully written to the storage subsystem in the storage device, which can raise some issues.

For example, the need to store the primary data (and any associated data/metadata) in the volatile memory system until all that primary data and its corresponding parity data have been successfully written to the storage subsystem in the storage device may prevent the acceptance of new primary data (e.g., from the host discussed above) until the volatile memory system is available to receive that new primary data, which can result in new primary data being accepted by the storage device in "bursts" when the resources of the volatile memory system are "released" at the end of the writing of current primary data to the storage subsystem in the storage device. As will be appreciated by one of skill in the art in possession of the present disclosure, such operations can introduce performance issues in storage device write performance (e.g., "excursions", reduced Quality of Service (QoS), etc.), which will increase with increased primary data write sizes. Furthermore, the need to store the primary data (and any associated data/metadata) in the volatile memory system until all that primary data and its corresponding parity data have been successfully written to the storage subsystem in the storage device may also requires larger volatile memory systems that increase the cost of the storage device, and because primary data (and any associated data/metadata) stored in the volatile memory system may be transferred to a non-volatile memory system with a power backup subsystem in the event of a system power loss, larger power backup systems that increase costs may be required as well.

Accordingly, it would be desirable to provide a storage device RAID data write system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a storage engine that is configured to: receive, from a host system, first primary data; store the first primary data in a volatile memory system; store a first subset of the first primary data in a storage system; generate first intermediate parity data using the first subset of the first primary data; store the first intermediate parity data in the volatile memory system; and erase, in response to storing the first subset of the first primary data in the storage system and storing the first intermediate parity data in the volatile memory system, the first subset of the first primary data from the volatile memory system.

BRIEF DESCRIPTION OF THE DRAWINGS

FIG. 7C is a schematic view illustrating an embodiment of the conventional operations of the storage device in FIG. 7B providing primary data and parity data in a superblock.

FIG. 7D is a schematic view illustrating an embodiment of the storage device of FIG. 2 performing conventional operations.

FIG. 10A is a schematic view illustrating an embodiment of the operations of the storage device in FIG. 9 according to the method of FIG. 6.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
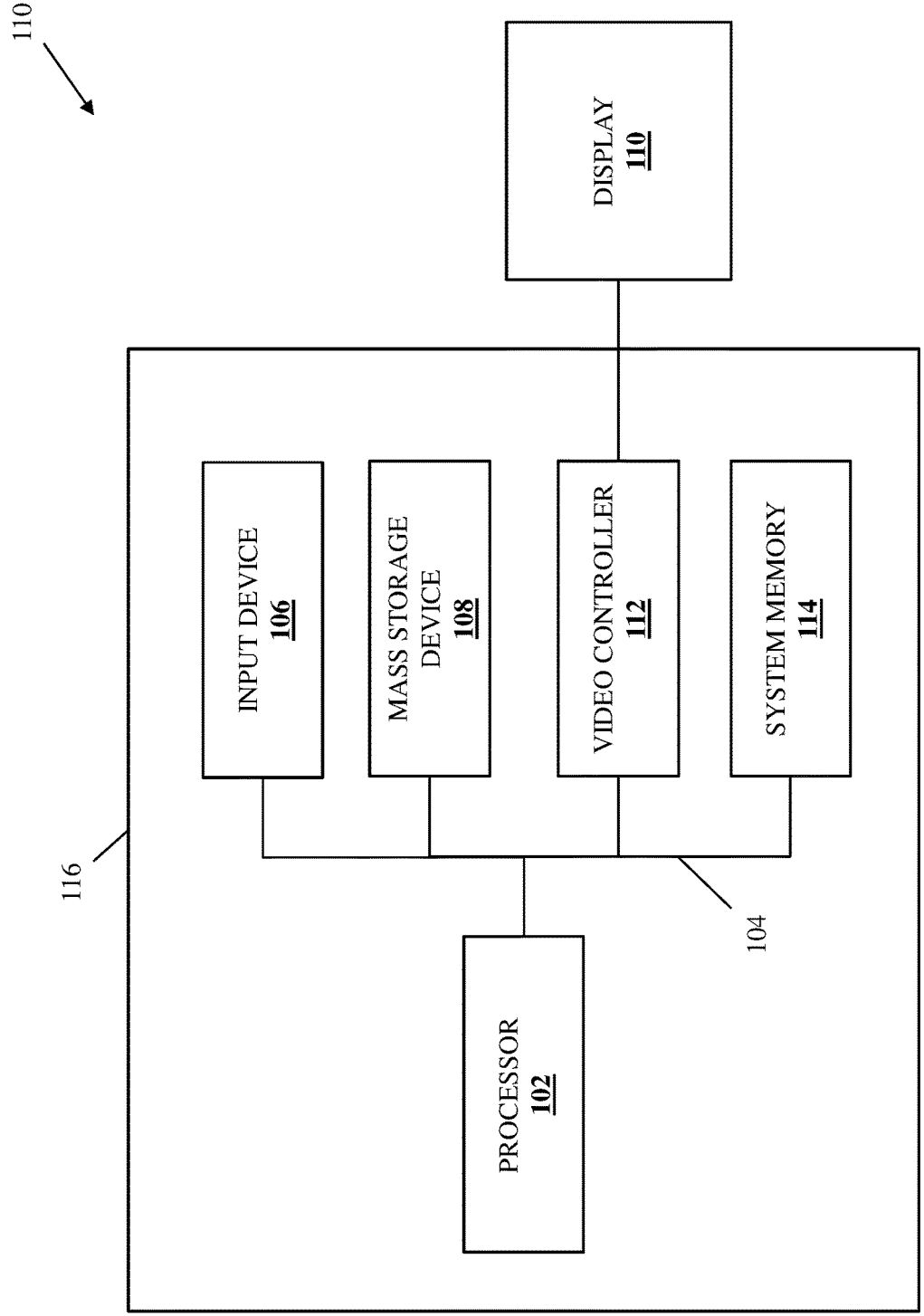
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
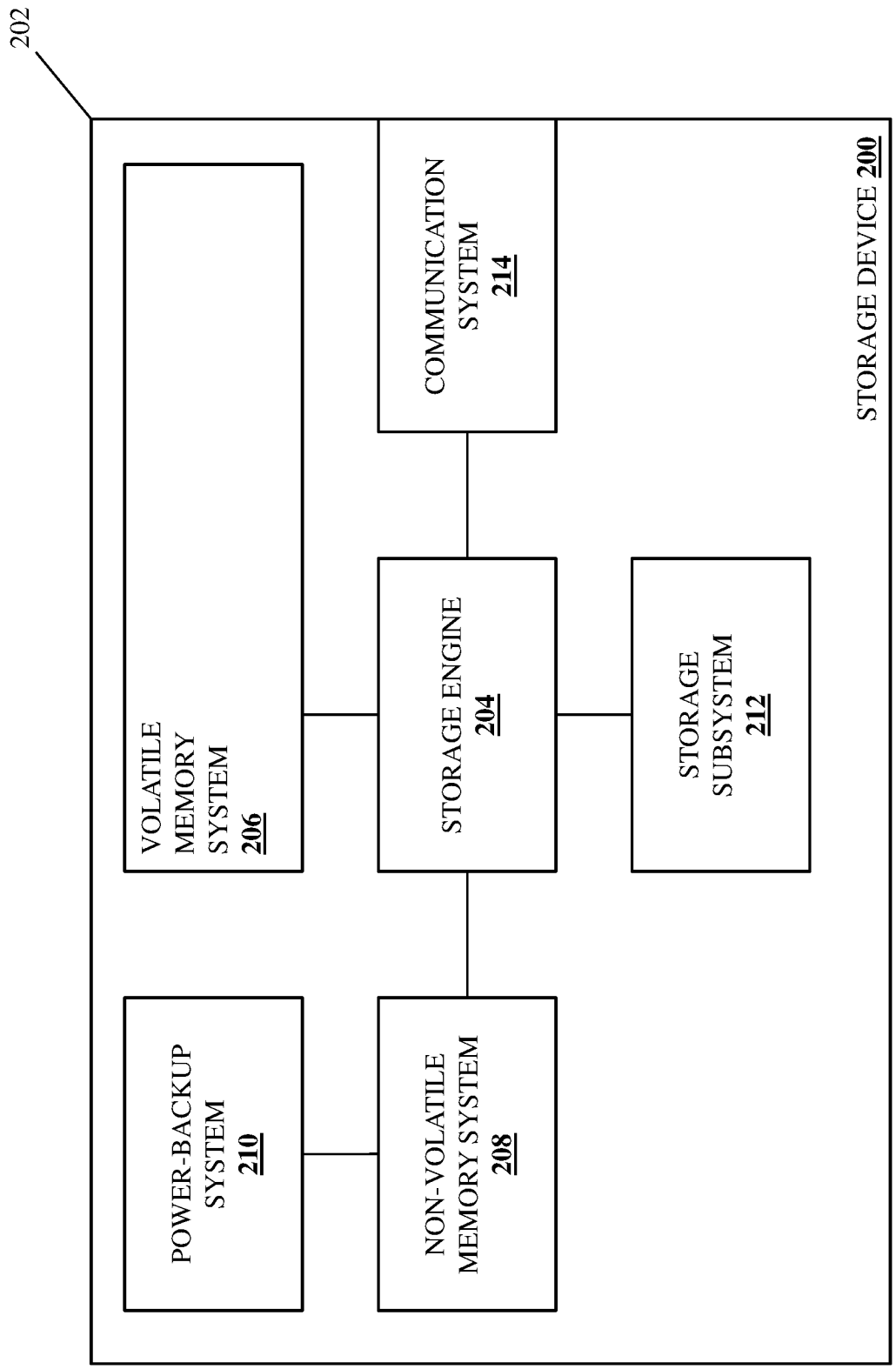
FIG. 2 is a schematic view illustrating an embodiment of a storage device that may utilized the storage device RAID data write intermediate parity system of the present disclosure.

Referring now to FIG. 2, an embodiment of a storage device 200 is illustrated that may include the storage device RAID data write intermediate parity system of the present disclosure. In an embodiment, the storage device 200 may be provided by the IHS 100 discussed above with reference to FIG. 1, may be provided as a component in the IHS 100, and/or may include some or all of the components of the IHS 100. In the specific examples provided below, the storage device 200 is described as being provided by a Solid State Drive (SSD) storage device. However, while illustrated and discussed as being provided by a specific storage device, one of skill in the art in possession of the present disclosure will recognize that the functionality of the storage device 200 discussed below may be provided by other storage devices that are configured to operate similarly as the storage device 200 discussed below. In the illustrated embodiment, the storage device 200 includes a chassis 202 that houses the components of the storage device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage engine 204 that is configured to perform the functionality of the storage engines and/or storage devices discussed below.

In the illustrated embodiment, the chassis 202 also houses a volatile memory system 206 that is coupled to the storage engine 204 (e.g., via a coupling between the volatile memory system 206 and the processing system), that may provide at least a portion of the memory system discussed above that provides the storage engine 204, or that may be separate from the memory system discussed above that provides the storage engine 204. In a specific example, the volatile memory system 206 may be provided by Dual Inline Memory Module (DIMM) memory devices, although one of skill in the art in possession of the present disclosure will appreciate how other volatile memory devices will fall within the scope of the present disclosure as well. In the illustrated embodiment, the chassis 202 also houses a non-volatile memory system 206 that is coupled to the storage engine 204 (e.g., via a coupling between the volatile memory system 206 and the processing system) and that, in the specific examples provided below, is coupled to a power-backup system 210 that may include batteries, capacitors, and/or other power backup devices that one of skill in the art in possession of the present disclosure will recognize may operate to configure the non-volatile memory system 208 to provide the non-volatile data storage discussed below.

The chassis 202 may also house a storage subsystem 212 that is coupled to the storage engine 204 (e.g., via a coupling between the storage subsystem 212 and the processing system) and that is discussed in further detail below. The chassis 302 may also house a communication system 214 that is coupled to the storage engine 304 (e.g., via a coupling between the communication system 214 and the processing system) and that may be provided by any of a variety of storage device communication components that one of skill in the art in possession of the present disclosure would recognize as allowing for the receiving of the primary data discussed below (e.g., from a host system). However, while a specific storage device 200 has been illustrated and described, one of skill in the art in possession of the present disclosure will recognize that storage devices (or other devices operating according to the teachings of the present disclosure in a manner similar to that described below for the storage device 200) may include a variety of components and/or component configurations for providing conventional storage device functionality, as well as the functionality discussed below, while remaining within the scope of the present disclosure as well.

Figure 3:
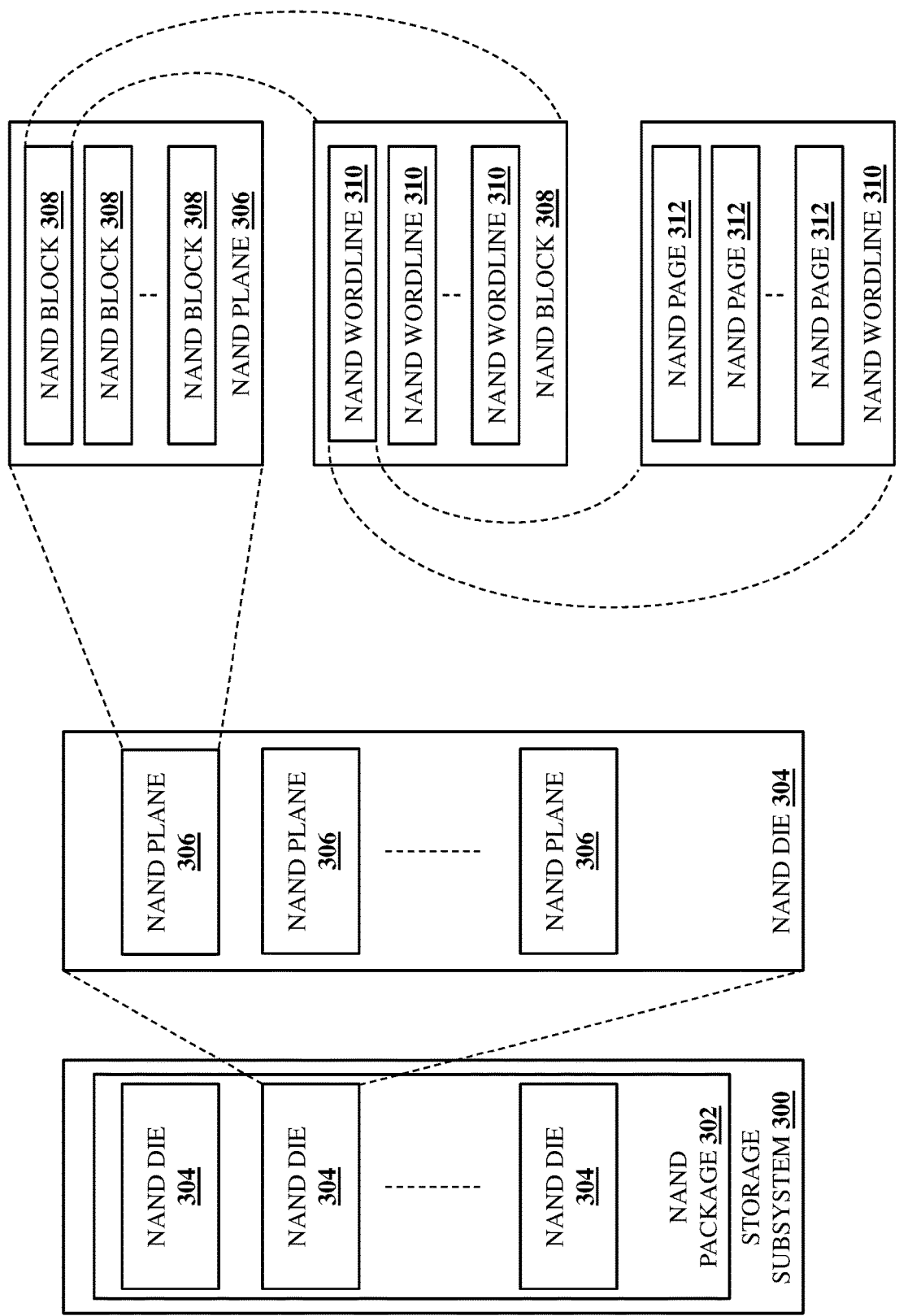
FIG. 3 is a schematic view illustrating an embodiment of a storage subsystem that may be included in the storage device of FIG. 2.

Referring now to FIG. 3, a storage subsystem 300 is illustrated that provides a specific example of the storage subsystem 212 discussed above with reference to FIG. 2, and one of skill in the art in possession of the present disclosure will appreciate how the storage subsystem 300 is described as being provided by an SSD storage subsystem that utilizes NAND technology, but that other storage devices utilizing other storage technologies may benefit from the teachings of the present disclosure and thus are envisioned as falling within its scope as well. In the illustrated embodiment, the storage subsystem 300 includes a NAND package 302 having a plurality of NAND dies 304 ("dies" below), with each NAND die including a plurality of NAND planes. As illustrated, each NAND plane 306 includes a plurality of NAND blocks 308 ("blocks" below), with each NAND block 308 including a plurality of NAND wordlines 310 ("wordlines" or "WLs" below), and each NAND wordline 310 including a plurality of NAND pages. As will be appreciated by one of skill in the art in possession of the present disclosure, the number of NAND die per NAND package, the number of NAND planes per NAND die, the number of NAND blocks per NAND plane, the number of NAND wordlines per NAND block, and/or the number of NAND pages per NAND wordline, may vary between NAND devices, and the teachings of the present disclosure may be applied to any of those NAND devices while remaining within the scope of the present disclosure.

Figure 4:
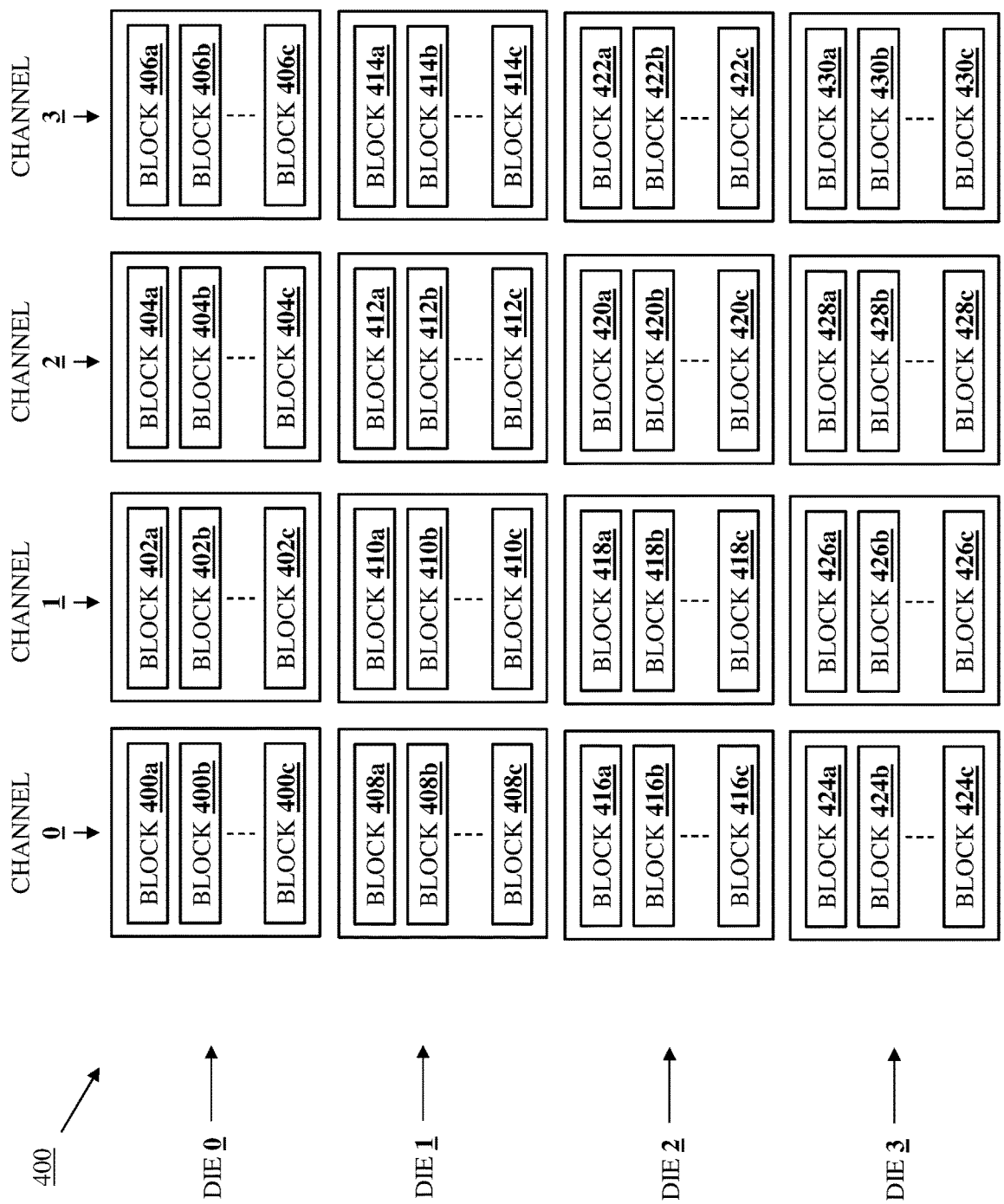
FIG. 4 is a schematic view illustrating an embodiment of the storage subsystem of FIG. 3.

Referring now to FIG. 4, an embodiment of a NAND device 400 is illustrated to provide a simplified example of how the NAND blocks discussed above may be configured. As will be appreciated by one of skill in the art in possession of the present disclosure, the NAND device 400 includes a plurality of die/channel combinations that each include a plurality of blocks, with a die 0/channel 0 combination including blocks 400a, 400b, and up to 400c; a die 0/channel 1 combination including blocks 402a, 402b, and up to 402c; a die 0/channel 2 combination including blocks 404a, 404b, and up to 404c; a die 0/channel 3 combination including blocks 406a, 406b, and up to 406c; a die 1/channel 0 combination including blocks 408a, 408b, and up to 408c; a die 1/channel 1 combination including blocks 410a, 410b, and up to 410c; a die 1/channel 2 combination including blocks 412a, 412b, and up to 412c; a die 1/channel 3 combination including blocks 414a, 414b, and up to 414c; a die 2/channel 0 combination including blocks 416a, 416b, and up to 416c; a die 2/channel 1 combination including blocks 418a, 418b, and up to 418c; a die 2/channel 2 combination including blocks 420a, 420b, and up to 420c; a die 2/channel 3 combination including blocks 422a, 422b, and up to 422c; a die 3/channel 0 combination including blocks 424a, 424b, and up to 424c; a die 3/channel 1 combination including blocks 426a, 426b, and up to 426c; a die 3/channel 2 combination including blocks 428a, 428b, and up to 428c; and a die 3/channel 3 combination including blocks 430a, 430b, and up to 430c.

Figure 5:
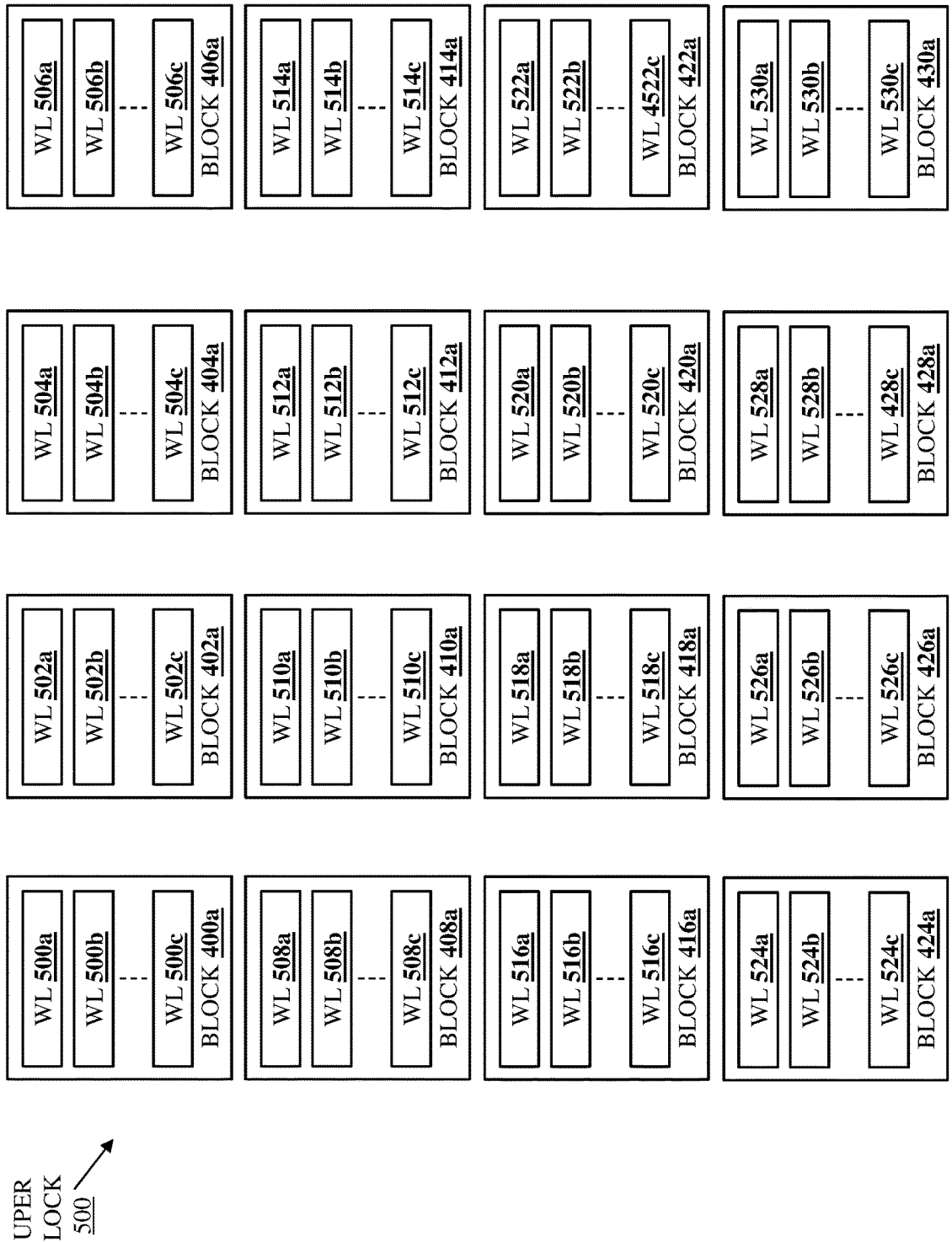
FIG. 5 is a schematic view illustrating an embodiment of a superblock provided by a portion of the storage subsystem of FIG. 4.

With reference to FIG. 5, an embodiment of a superblock 500 is illustrated that may be provided from the NAND device 400 discussed above with reference to FIG. 4, and one of skill in the art in possession of the present disclosure will appreciate how the superblock 500 illustrated in FIG. 5 provides an example of just one superblock that may be provided from a respective one of the blocks included in each of the die/channel combination discussed above. For example, superblocks may be provided by a collection of physical blocks, with a fixed number of blocks from each die (e.g., each die/channel combination) provided in each superblock. As will be appreciated by one of skill in the art in possession of the present disclosure, providing physical blocks from each die/channel combination in a superblock operates to achieve the highest die parallelism during program or erasure of the superblock (i.e., due to data writes occurring on a superblock basis at a Firmware Translation Layer (FTL) level/application layer of storage device firmware, with a particular superblock selected, erased, and written completely).

As such, the superblock 500 includes block 400*a* having wordlines ("WL") 500*a*, 500*b*, and up to 500*c*; block 402*a* having wordlines ("WL") 502*a*, 502*b*, and up to 502*c*; block 404*a* having wordlines ("WL") 504*a*, 504*b*, and up to 504*c*; block 406*a* having wordlines ("WL") 506*a*, 506*b*, and up to 506*c*; block 408*a* having wordlines ("WL") 508*a*, 508*b*, and up to 508*c*; block 410*a* having wordlines ("WL") 510*a*, 510*b*, and up to 510*c*; block 412*a* having wordlines ("WL") 512*a*, 512*b*, and up to 512*c*; block 414*a* having wordlines ("WL") 514*a*, 514*b*, and up to 514*c*; block 416*a* having wordlines ("WL") 516*a*, 516*b*, and up to 516*c*; block 418*a* having wordlines ("WL") 518*a*, 518*b*, and up to 518*c*; block 420*a* having wordlines ("WL") 520*a*, 520*b*, and up to 520*c*; block 422*a* having wordlines ("WL") 522*a*, 522*b*, and up to 522*c*; block 424*a* having wordlines ("WL") 524*a*, 524*b*, and up to 524*c*; block 426*a* having wordlines ("WL") 526*a*, 526*b*, and up to 526*c*; block 428*a* having wordlines ("WL") 528*a*, 528*b*, and up to 528*c*; and block 430*a* having wordlines ("WL") 530*a*, 530*b*, and up to 530*c*. However, while the superblock 500 illustrates the use of a single block from each die/channel combination of FIG. 4, one of skill in the art in possession of the present disclosure will recognize how superblocks are often created using two blocks from each die/channel combination (e.g., when working with a two NAND plane storage device), and how that and other superblock configurations will fall within the scope of the present disclosure as well.

Furthermore, one of skill in the art in possession of the present disclosure will recognize how the superblock 500, and the examples discussed below that are based on the superblock 500, provide "15+1" RAID data frames that include 15 primary data segments and 1 parity data segment. However, one of skill in the art in possession of the present disclosure will also appreciate how superblocks may be configured to provide "31+1" RAID data frames that include 31 primary data segments and 1 parity data segment, "63+1" RAID data frames that include 63 primary data segments and 1 parity data segment, as well as other RAID data frame configurations while remaining within the scope of the present disclosure as well.

As discussed in further detail below, when performing a conventional RAID data write, discussed in further detail below, storage device firmware in a storage device may collect primary data that will fit in the wordlines provided in a die (e.g., die 0 in FIG. 4) across each of the channels (e.g., channels 0-3 in FIG. 4) before writing to the superblock 500. For example, in a first data write window, the storage device firmware in the storage device may collect primary data that will fit in the wordlines 500*a*, 502*a*, 504*a*, and 506*a* in the blocks 400*a*, 402*a*, 404*a*, and 406*a*, and will write that primary data to those wordlines in the first data write window. Similarly, in subsequent data write windows, the storage device firmware in the storage device may collect and write primary data in the wordlines 508*a*, 510*a*, 512*a*, and 514*a* in the blocks 408*a*, 410*a*, 412*a*, and 414*a*; collect and write primary data in the wordlines 516*a*, 518*a*, 520*a*, and 522*a* in the blocks 416*a*, 418*a*, 420*a*, and 422*a*; collect and write primary data in the wordlines 524*a*, 526*a*, and 528*a* in the blocks 424*a*, 426*a*, and 428*a*; and then write parity data (generated from the primary data written as discussed above) in the wordline 530*a* in the block 430*a*. This process may then be repeated (e.g., with the "b" rows starting with wordline 500*b* in block 400*a* and ending with wordline 530*b* in block 430*a*, and up to the "c" rows starting with wordline 500*c* in block 400*a* and ending with wordline 530*c* in block 430*a*), such that primary data is written in blocks 400*a*-428*a*, and parity data is written in block 430*a*.

Figure 6:
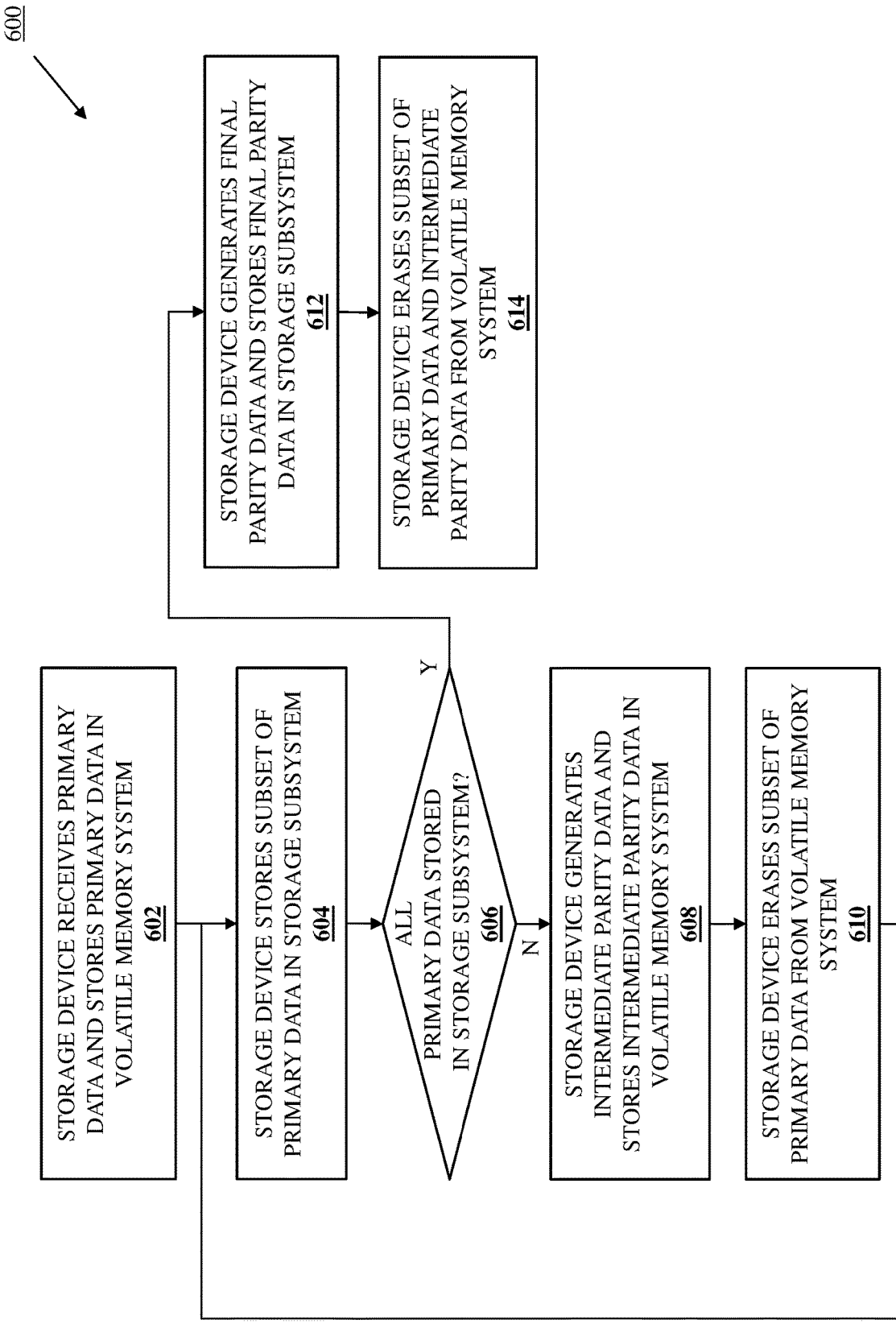
FIG. 6 is a flow chart illustrating an embodiment of a method for performing intermediate parity RAID data writes in a storage device.

Referring now to FIG. 6, an embodiment of a method 600 for performing intermediate parity Redundant Array of Independent Disk (RAID) data writes in a storage device is illustrated. As discussed below, the systems and methods of the present disclosure provide for the generation of respective intermediate parity data for subsets of primary data being stored in storage subsystem, and the erasure of corresponding subsets of the primary data from a volatile memory system following the storage of their respective intermediate parity data in the volatile memory system, with the respective intermediate parity data used to reconstruct portions of its corresponding subset of primary data in the event it becomes unrecoverable. For example, the storage device RAID data write intermediate parity system includes a storage device coupled to a host system and including a storage subsystem and a volatile memory system. The storage device RAID data write intermediate parity system receives first primary data from the host system, and stores the first primary data in the volatile memory system. The storage device RAID data write intermediate parity system then stores a first subset of the first primary data in the storage system, generates first intermediate parity data using the first subset of the first primary data, stores the first intermediate parity data in the volatile memory system and, in response, erases the first subset of the first primary data from the volatile memory system. As discussed below, the release of volatile memory system resources as primary data is written to a storage subsystem will reduce performance issues that produce the "excursions", reduced QoS, and/or other storage device write performance issues, and reduce storage device cost by reducing the need for larger volatile memory systems and associated power backup subsystem required for non-volatile memory system used to back up those volatile memory systems.

Figure 7A:
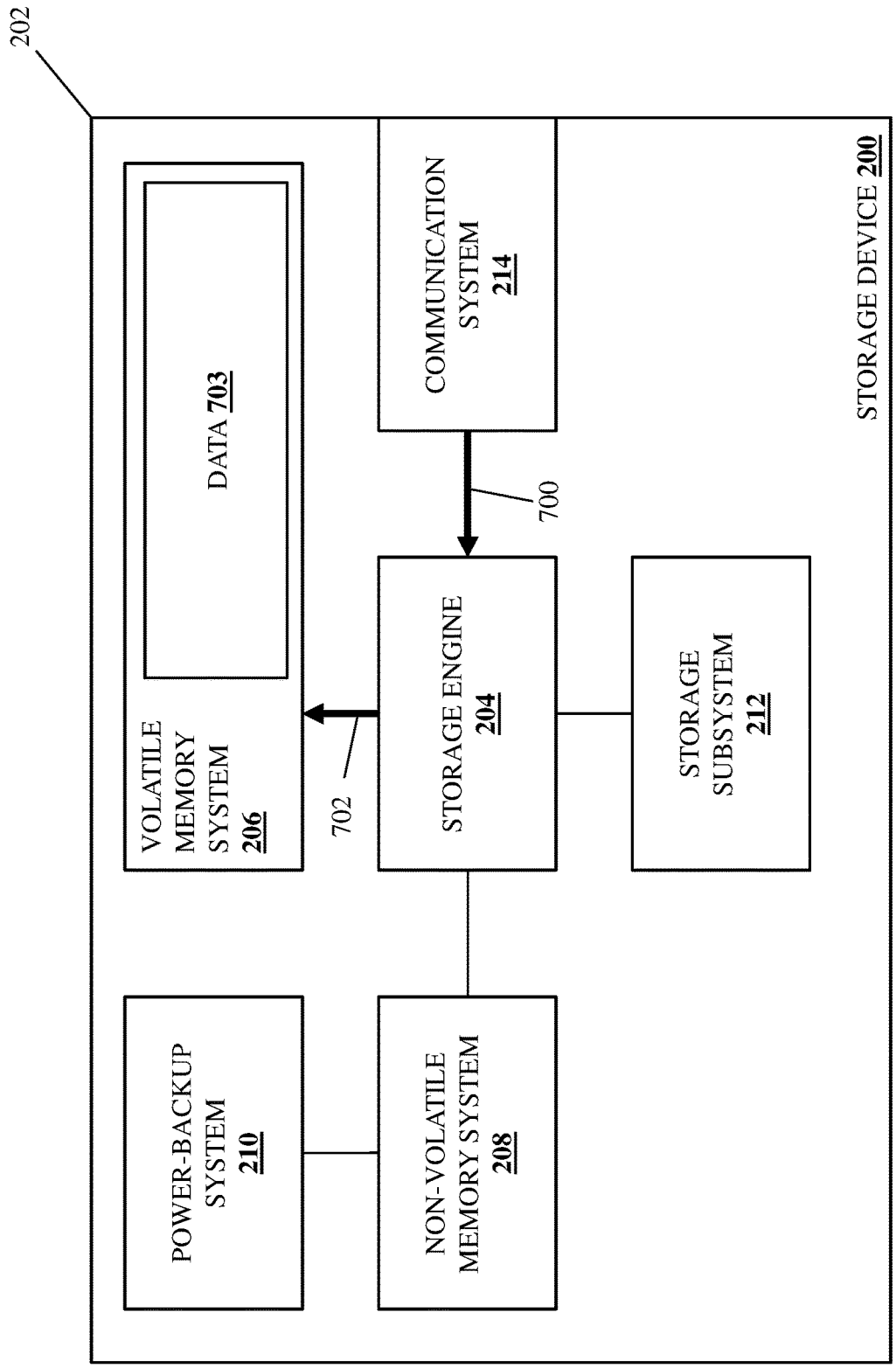
FIG. 7A is a schematic view illustrating an embodiment of the storage device of FIG. 2 performing conventional operations.
Figure 7B:
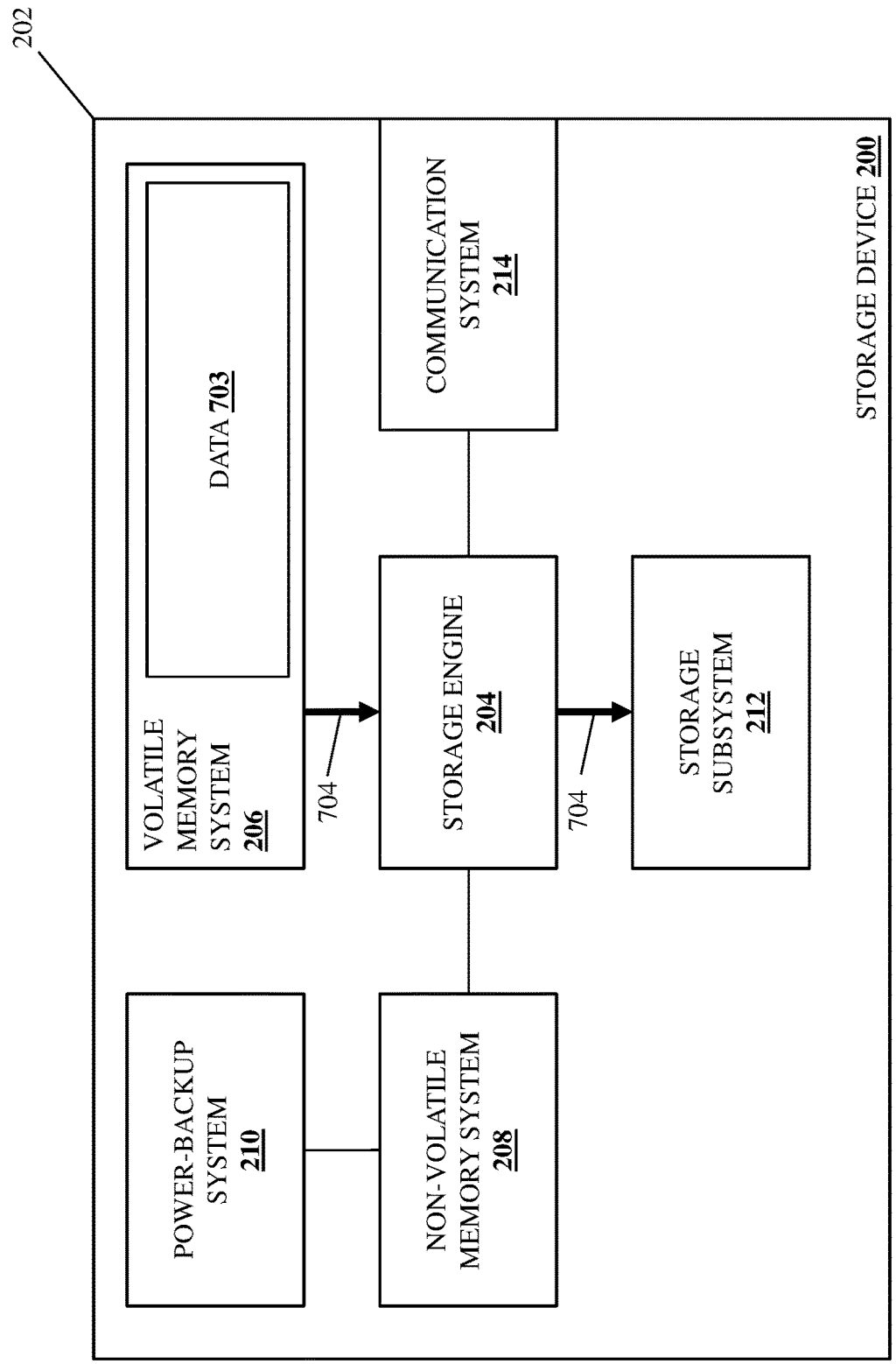
FIG. 7B is a schematic view illustrating an embodiment of the storage device of FIG. 2 performing conventional operations.

With reference to FIGS. 7A, 7B, 7C, and 7D, conventional RAID data write operations are described as being performed by the storage device 200 of FIG. 2 for the purposes of comparison to the operations of the storage device 200 using the storage device RAID data write intermediate parity system discussed below. As illustrated in FIG. 7A, the storage engine 204 may perform data receiving operations 700 that include receiving data via the communication system 214, and volatile memory data storage operations 702 that include storing that data 703 (e.g., the "primary" data discussed above) in the volatile memory system 206. With reference to FIG. 7B, the storage engine 204 may then perform storage subsystem data write operations 704 that include retrieving the data 703 from the volatile memory system 206 and writing that data to the storage subsystem 212, and one of skill in the art in possession of the present disclosure will appreciate how those storage subsystem data write operations 704 may be performed similarly as discussed above with reference to FIG. 5.

For example, with reference to FIG. 7C, an embodiment of the storage subsystem data write operations 704 to write a portion of the data 703 to the superblock 500 discussed above with reference to FIG. 5 is illustrated. As will be appreciated by one of skill in the art in possession of the present disclosure, the superblock 500 in FIG. 7C illustrates each die/channel combination as including four segments 1, 2, 3, and 4, with data only being written to the segments 1 in the die/channel combinations. However, one of skill in the art in possession of the present disclosure will recognize how a data write to the superblock 500 would include writing data to all of the segments 1, 2, 3, and 4 in each of the die/channel combinations, and how segments 2, 3, and 4 in each of the die/channel combinations may be written in a manner that is similar to that illustrated and described for segments 1 in FIG. 7C.

Similarly as discussed above with reference to FIGS. 4 and 5, in a first data write window and as part of the storage subsystem data write operations 704, the storage device firmware in the storage device 200 may collect an amount of the data 703 that will fit in the wordlines 500a, 502a, 504a, and 506a in the blocks 400a, 402a, 404a, and 406a, and will write some of the data 703 to those wordlines in the first data write window. As such, the storage subsystem data write operations 704 may include writing, in a first data write window, some of the data 703 to segment 1 in the die 0/channel 0 combination, some of the data 703 to segment 1 in the die 0/channel 1 combination, some of the data 703 to segment 1 in the die 0/channel 2 combination, and some of the data 703 to segment 1 in the die 0/channel 3 combination.

Similarly, the storage subsystem data write operations 704 may include writing, in a second data write window, some of the data 703 to segment 1 in the die 1/channel 0 combination, some of the data 703 to segment 1 in the die 1/channel 1 combination, some of the data 703 to segment 1 in the die 1/channel 2 combination, and some of the data 703 to segment 1 in the die 1/channel 3 combination. Similarly, the storage subsystem data write operations 704 may include writing, in a third data write window, some of the data 703 to segment 1 in the die 2/channel 0 combination, some of the data 703 to segment 1 in the die 2/channel 1 combination, some of the data 703 to segment 1 in the die 2/channel 2 combination, and some of the data 703 to segment 1 in the die 2/channel 3 combination. Finally, the storage subsystem data write operations 704 may include writing, in a fourth data write window, some of the data 703 to segment 1 in the die 3/channel 0 combination, some of the data 703 to segment 1 in the die 3/channel 1 combination, and some of the data 703 to segment 1 in the die 3/channel 2 combination.

Furthermore, FIG. 7C illustrates how, as part of the storage subsystem data write operations 704, the storage device firmware in the storage device 200 may perform parity generation operations (illustrated by parity generation operation elements 704a in FIG. 7C) to generate parity data for the data 703 written to the segments 1 in the die/channel combinations as discussed above, and then write that parity data to segment $1_P$ in the die 3/channel 3 combination. As such, a "15+1" RAID5 data write may be provided in the superblock 500. With reference to FIG. 7D and following the writing of the data 703 and corresponding parity data to the superblock 500 provided by the storage subsystem 212, the storage engine 204 may then perform volatile memory system data erasure operations 706 that include erasing the data 703 from the volatile memory system 206.

As discussed above, due to the possibility of write errors, power loss, or other issues that may occur during the writing of the data 703 to the superblock 500 provided by the storage subsystem 212, the data 703 will remain stored in the volatile memory system 206 until all the data 703 and its corresponding parity data have been successfully written to the storage subsystem 212, and the need to store the data 703 in the volatile memory system 206 until all the data 703 and its corresponding parity data have been successfully written to the storage subsystem 212 prevents the acceptance of new data until the volatile memory system 206 is available to receive that new data (e.g., following the erasure of the data 703 from the volatile memory system 206), which can result in new data being accepted by the storage device 200 in "bursts" when the resources of the volatile memory system 206 are "released" (e.g., following the erasure of the data 703 from the volatile memory system 206). As will be appreciated by one of skill in the art in possession of the present disclosure, such operations can introduce performance issues with data write performance in the storage device 200 (e.g., "excursions", reduced QoS, etc.), which will increase with increased data write sizes. Furthermore, such operations require a larger volatile memory system 206 that increases the cost of the storage device 200, and because the data 703 stored in the volatile memory system 206 may be transferred to the non-volatile memory system 208 with the power backup system 210 in the event of a system power loss, a larger power backup system 210 that increases costs may be required as well.

As will be appreciated by one of skill in the art in possession of the present disclosure, the issues discussed above with conventional storage device RAID data write can cause particular issues with particular storage devices. For example, Non-Volatile Memory express (NVMe) Zoned NameSpace (ZNS) SSD storage devices may be configured to group their storage capacity into zones that may be read in any order, which allows the NVMe ZNS SSD storage devices to improve internal data placement and provide increased performance via increased write throughputs, increased QoS, and increased capacity. However, because NVMe ZNS SSD storage devices may allow superblocks to be created per zoned namespace and be written to in parallel, primary data may be held in buffers in the volatile memory system for each superblock until parity data is generated and written for that primary data. As will be appreciated by one of skill in the art in possession of the present disclosure, the data write philosophy discussed above of holding primary data in the buffers in the volatile memory system until the corresponding parity data is generated and written to the storage subsystem will introduce scaling difficulties in NVMe ZNS SSD storage devices that accumulate primary data for multiple different RAID frames simultaneously.

As discussed in further detail below, the storage device RAID data write intermediate parity system of the present disclosure operates to release resources of the volatile memory system 206 as subsets of the primary data are written to a storage subsystem 212 by erasing those subsets of the primary data from the volatile memory system 206, while also generating and storing intermediate parity data for those subsets of the primary data so that they may be reconstructed in the event they are unrecoverable from the storage subsystem 212. As discussed below, such operations reduce performance issues such as those that produce the "excursions" and reduced QoS in storage device write performance discussed above, and reduce storage device cost by reducing the need for larger volatile memory systems and associated power backup subsystem required for non-volatile memory system used to back up the volatile memory system. Furthermore, one of skill in the art in possession of the present disclosure will appreciate how the RAID data write operations discussed in the specific examples above are RAID5 data writes that generate parity data for primary data in order to allow the reconstruction of a single segment of the primary data in the event that it become unrecoverable, and that the teachings below may be extended to RAID6 data writes that generate both parity data and "Q" data for primary data in order to allow the reconstruction of two segments of the primary data in the event that it become unrecoverable while remaining within the scope of the present disclosure as well.

As will be appreciated by one of skill in the art in possession of the present disclosure, the method 600 describes the storage of "first" primary data in the storage subsystem 212 of the storage device 200, and may be repeated for other primary data (e.g., "second" primary data, "third" primary data, etc., that may be received from a host system over time). As such, one of skill in the art in possession of the present disclosure will recognize how, during the performance of the method 600 to store "first" primary data, the storage device 200 may receive "second" primary data, "third" primary data, etc., and that "second" primary data may be stored in the storage subsystem 212 similarly as described below for the "first" primary data according to the method 600, that "third" primary data may be stored in the storage subsystem 212 similarly as described below for the "first" primary data according to the method 600, and so on.

Figure 8A:
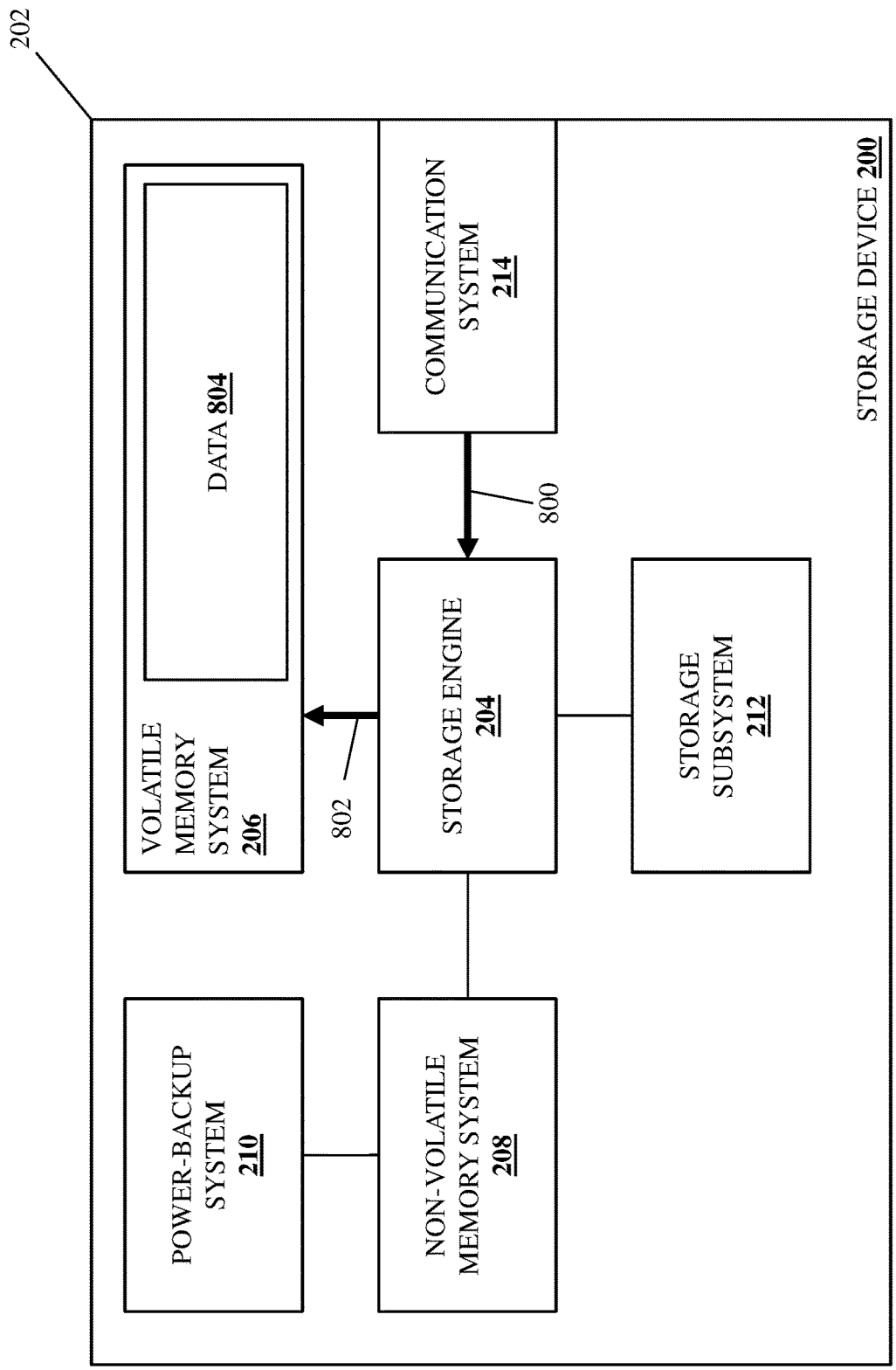
FIG. 8A is a schematic view illustrating an embodiment of the storage device of FIG. 2 operating according to the method of FIG. 6.

The method 600 begins at block 602 where a storage device receives primary data and stores the primary data in a volatile memory system. With reference to FIG. 8A, in an embodiment of block 602, the storage engine 204 in the storage device 200 may perform data receiving operations 800 that include receiving data via the communication system 214. For example, the storage device 200 may be provided in the IHS 100 discussed above with reference to FIG. 1 (e.g., as the mass storage device 108), and a host system (e.g., provided by the processor 102, system memory 114, and/or other components in the IHS 100) may generate and/or transmit data for storage in the storage device 200. In response to receiving the data, the storage engine 204 in the storage device 200 may perform volatile memory data storage operations 802 that include writing or otherwise storing data 804 in the volatile memory system 206.

Figure 8B:
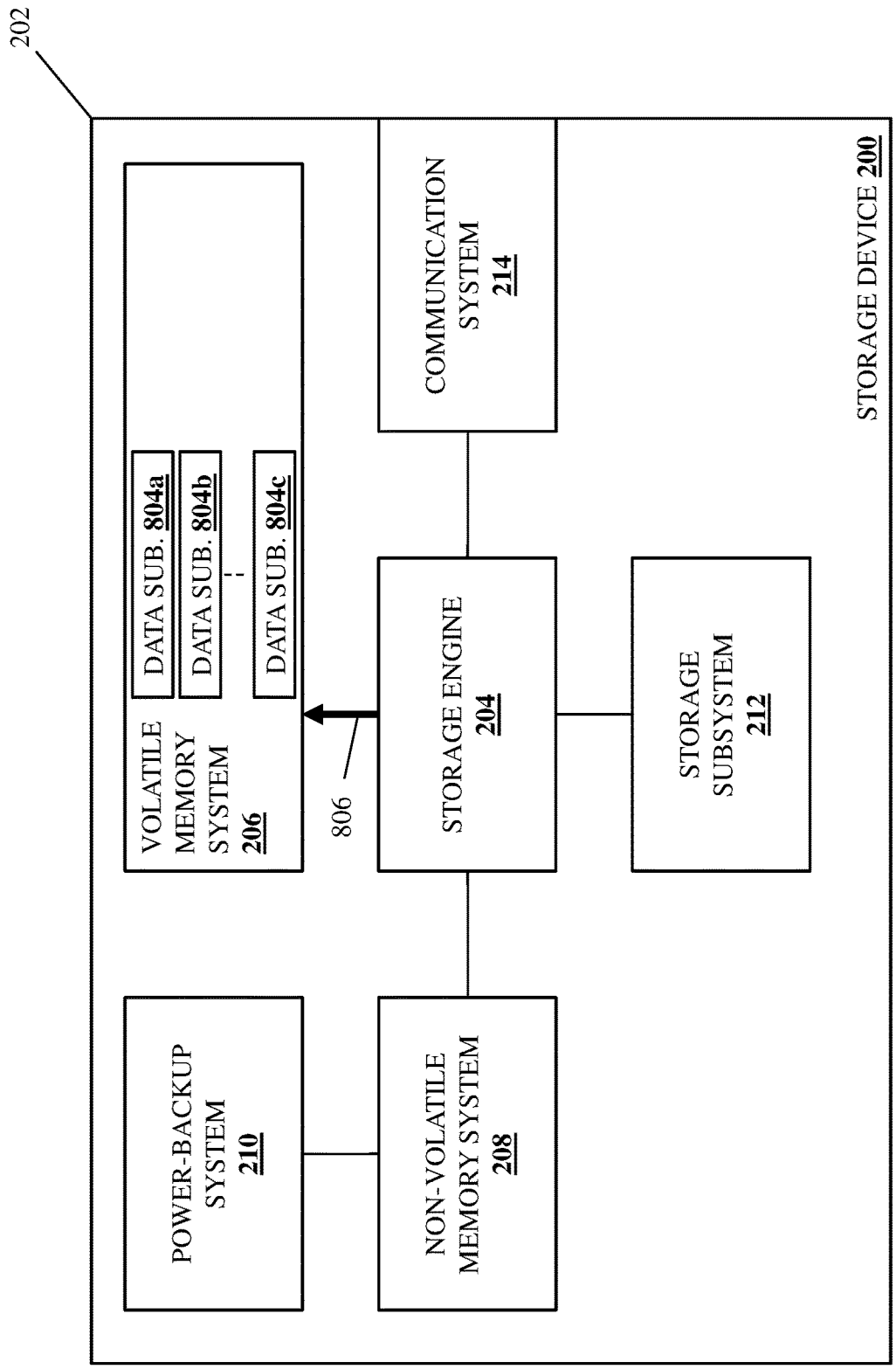
FIG. 8B is a schematic view illustrating an embodiment of the storage device of FIG. 2 operating according to the method of FIG. 6.

As will be appreciated by one of skill in the art in possession of the present disclosure, the data 804 (also referred to as "primary" data below) stored in the volatile storage system 206 may include data provided for storage (e.g., by the host system as described above), metadata generated for that data (e.g., Error Correction Code (ECC) data that may provide for secondary error correction operations that are in addition to any of the RAID error correction operations discussed below), command context data (e.g., per NAND block), as well as any other data that would be apparent to one of skill in the art in possession of the present disclosure. With reference to FIG. 8B, in some embodiments, the storage engine 204 in the storage device 200 may perform data segmentation operations 806 in order to logically segment the data 804 to provide data subsets 804a, 804b, and up to 804c, and one of skill in the art in possession of the present disclosure will appreciate how a variety of data segmentation techniques may be performed at block 602 that will fall within the scope of the present disclosure.

Figure 9:
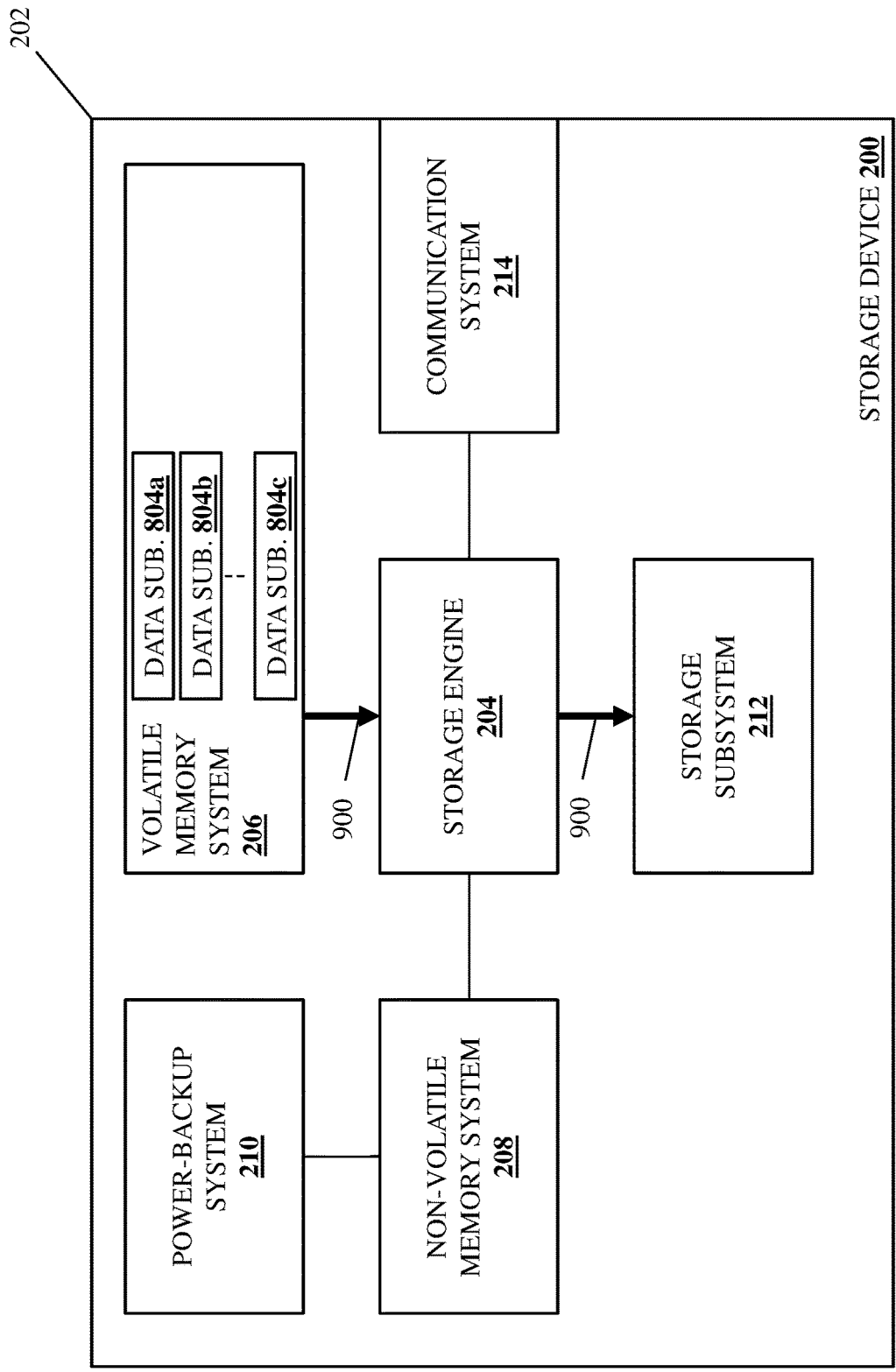
FIG. 9 is a schematic view illustrating an embodiment of the storage device of FIG. 2 operating according to the method of FIG. 6.

The method 600 then proceeds to block 604 where the storage device stores a subset of the primary data in a storage subsystem. With reference to FIG. 9, in an embodiment of a first iteration of block 604, the storage engine 204 in the storage device 200 may perform storage subsystem data storage operations 900 that include retrieving a subset of the primary data stored in the volatile memory system 206 (e.g., the data subset 804a of the data 804 in this first iteration of block 604), and writing or otherwise storing that subset of the primary data in the storage subsystem 212. For example, with reference to FIG. 10A, an embodiment of the storage subsystem data storage operations 900 to write the data subset 804a to the superblock 500 discussed above with reference to FIG. 5 is illustrated. As will be appreciated by one of skill in the art in possession of the present disclosure, the superblock 500 in the examples provided below illustrates each die/channel combination including four segments 1, 2, 3, and 4, with data only being written to the segments 1 in the die/channel combinations. However, one of skill in the art in possession of the present disclosure will recognize how a data write to the superblock 500 would include writing data to all of the segments 1, 2, 3, and 4 in each of the die/channel combinations, and how segments 2, 3, and 4 in each of the die/channel combinations may be written in a manner that is similar to that illustrated for segments 1 in the examples provided below.

With reference back to FIGS. 4 and 5, in a first iteration of block 604 of the method 600 and as part of the storage subsystem data storage operations 900, the storage engine 204 in the storage device 200 may have logically segmented the data 804 such that the data segment 804a will fit in the wordlines 500a, 502a, 504a, and 506a in the blocks 400a, 402a, 404a, and 406a, and may write that data segment 804a to those wordlines in the first iteration of block 604 of the method 600. As such, with reference to FIG. 10A, the storage subsystem data storage operations 900 may include writing, in a first iteration of block 604 of the method 600, a first portion of the data subset 804a to segment 1 in the die 0/channel 0 combination, a second portion of the data subset 804a to segment 1 in the die 0/channel 1 combination, a third portion of the data subset 804a to segment 1 in the die 0/channel 2 combination, and a fourth portion of the data subset 804a to segment 1 in the die 0/channel 3 combination.

The method 600 then proceeds to decision block 606 where the method 600 proceeds depending on whether all the primary data has been stored in the storage subsystem. As discussed in further detail below, the storage engine 204 in the storage device 200 is configured to generate the intermediate parity data for the subsets of primary data being stored in the storage subsystem 212 and store that intermediate parity data in the volatile memory system 206 until all of that primary data has been stored in the storage subsystem 212, after which final parity data may be generated and stored in the storage subsystem 212. As such, the operation of the storage engine 204 in the storage device 200 will be dictated by whether or not the storage subsystem data storage operations 900 performed at block 604 have completed the storage of the primary data from the volatile memory system 206 in the storage subsystem 212.

Figure 10B:
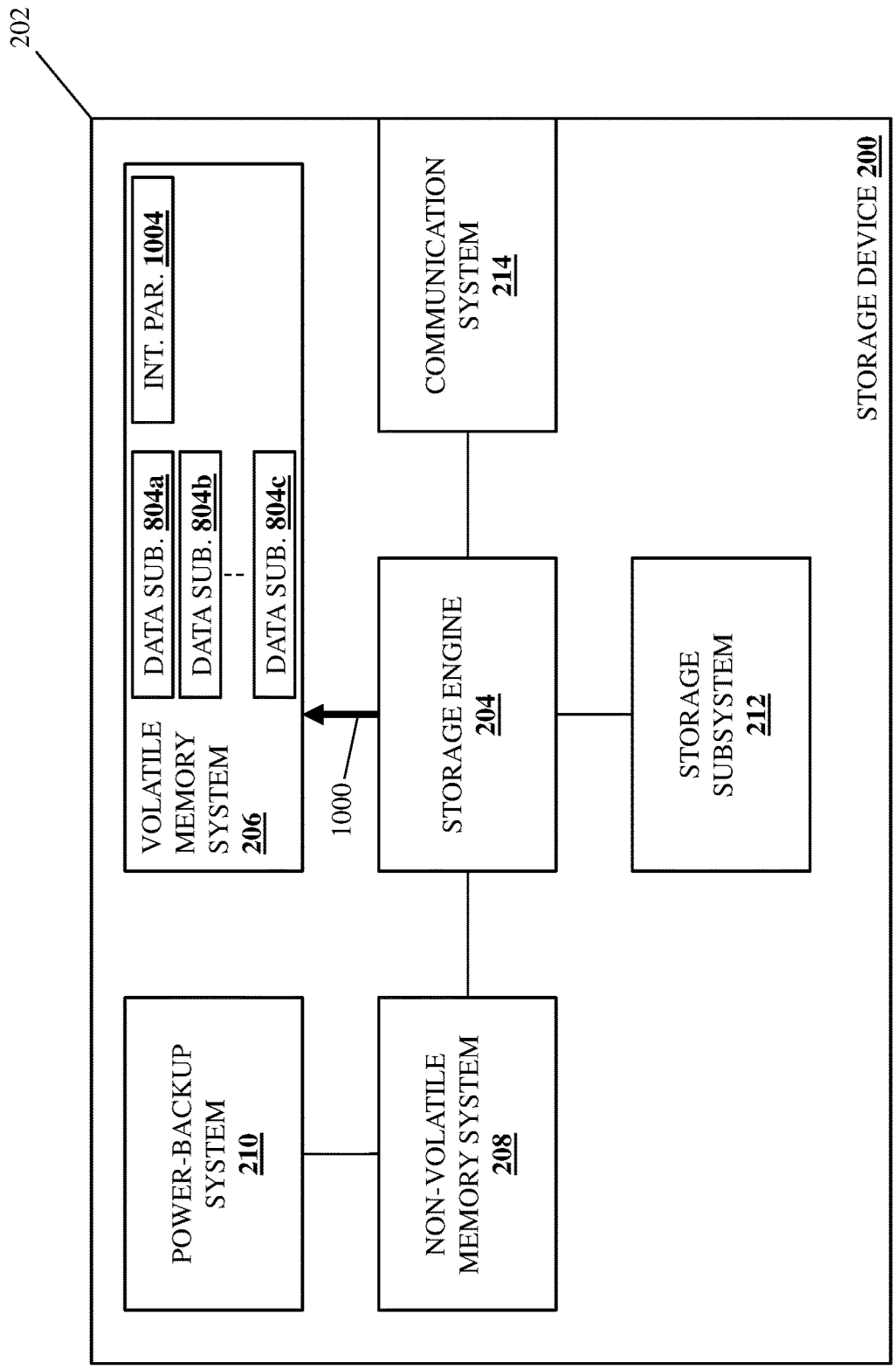
FIG. 10B is a schematic view illustrating an embodiment of the storage device of FIG. 2 operating according to the method of FIG. 6.

If, at decision block 606, all the primary data has not been stored in the storage subsystem, the method 600 proceeds to block 608 where the storage device generates intermediate parity data and stores the intermediate parity data in the volatile memory system. With reference to FIGS. 10A and 10B, in an embodiment of block 608 and following the first iteration of block 604 of the method 600 discussed above, the storage engine 204 in the storage device 200 may also perform intermediate parity data generation and storage operations 1000 that may include generating intermediate parity data (illustrated by intermediate parity generation operation elements 1000a in FIG. 10A) for the data subset 804a written to the segments 1 in the die 0/channel 0-3 combinations as discussed above, and then writing that intermediate parity data 1004 (e.g., as "segment $1_{iP1}$" in FIG. 10A) in the volatile memory system 206.

Figure 10C:
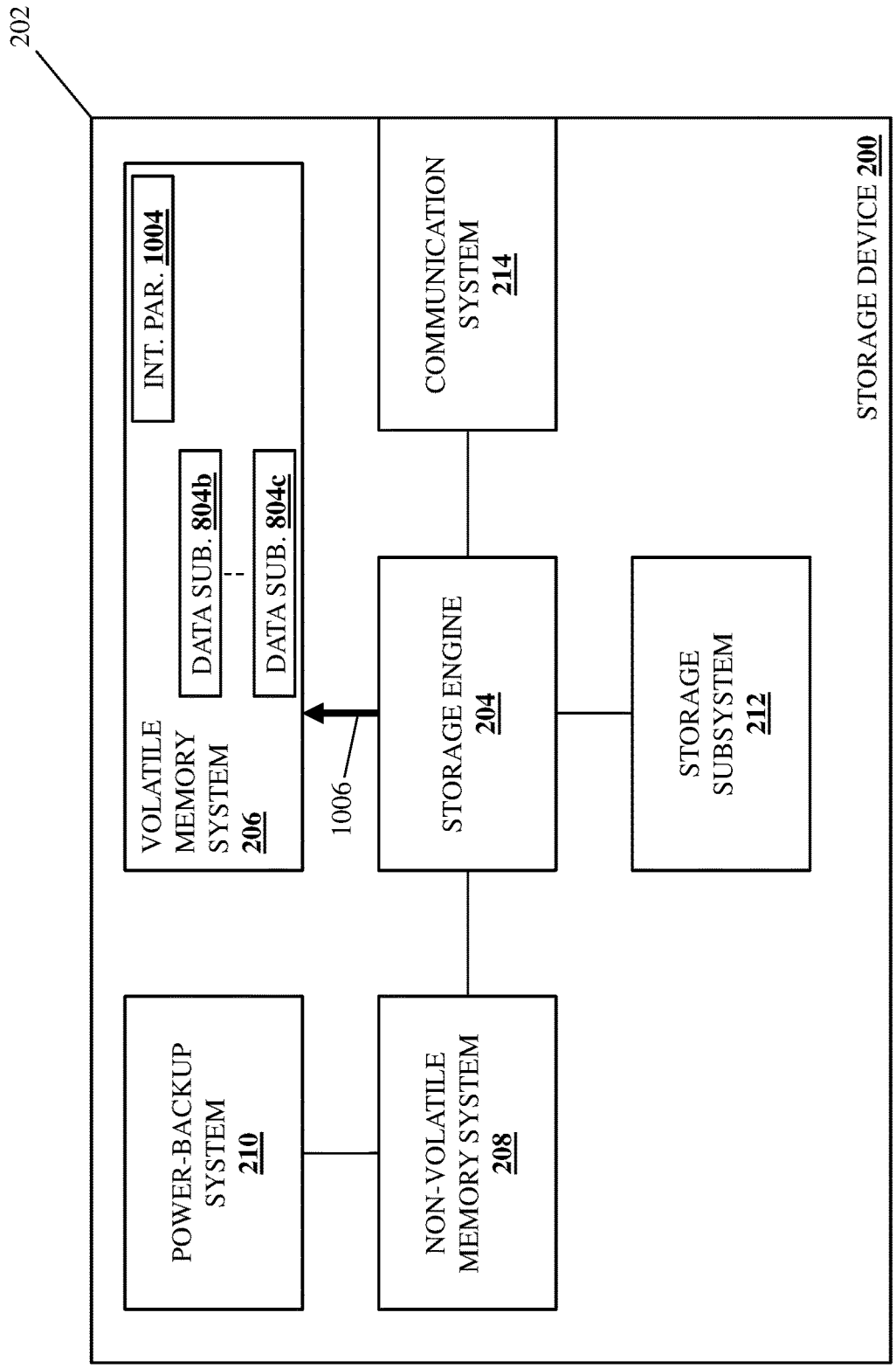
FIG. 10C is a schematic view illustrating an embodiment of the storage device of FIG. 2 operating according to the method of FIG. 6.

The method 600 then proceeds to block 610 where the storage device erases the subset of the primary data from the volatile memory system. With reference to FIG. 10C, in an embodiment of block 610, the storage engine 204 in the storage device 200 may perform data subset erasure operations 1006 that include erasing the data subset 804a from the volatile memory system 206. As will be appreciated by one of skill in the art in possession of the present disclosure, the erasure of the data subset 804a from the volatile memory system 206 frees of resources of the volatile memory system 206 that may be utilized to store other data. As such, the host system discussed above may have provided first primary data that includes the data subset 804a, and erasure of the data subset 804a from the volatile memory system 206 may allow second primary data (which is different than the first primary data) provided by the host system to be stored in the volatile memory system 206 along with the data subsets 804b and up to 804c of the first primary data.

One of skill in the art in possession of the present disclosure will recognize how the freeing up of resources of the volatile memory system before all the current/first primary data and its corresponding parity data have been successfully written to the storage subsystem 212 in the storage device 200 reduces the need to accept the new/second primary data by the storage device in "bursts", thus reducing "excursions", reduced QoS, and other issues in data write performance for the storage device 200, providing more consistent/smoother write performance, lowering write latency, and providing other benefits that would be apparent to one of skill in the art in possession of the present disclosure. Furthermore, as discussed below, the generation and storage of the intermediate parity data as discussed above addresses issues associated with the possibility of a portion/segment of the primary data being unrecoverable from the storage system 212, as that intermediate parity data may be used to reconstruct portions of the primary data that become unrecoverable.

Figure 11A:
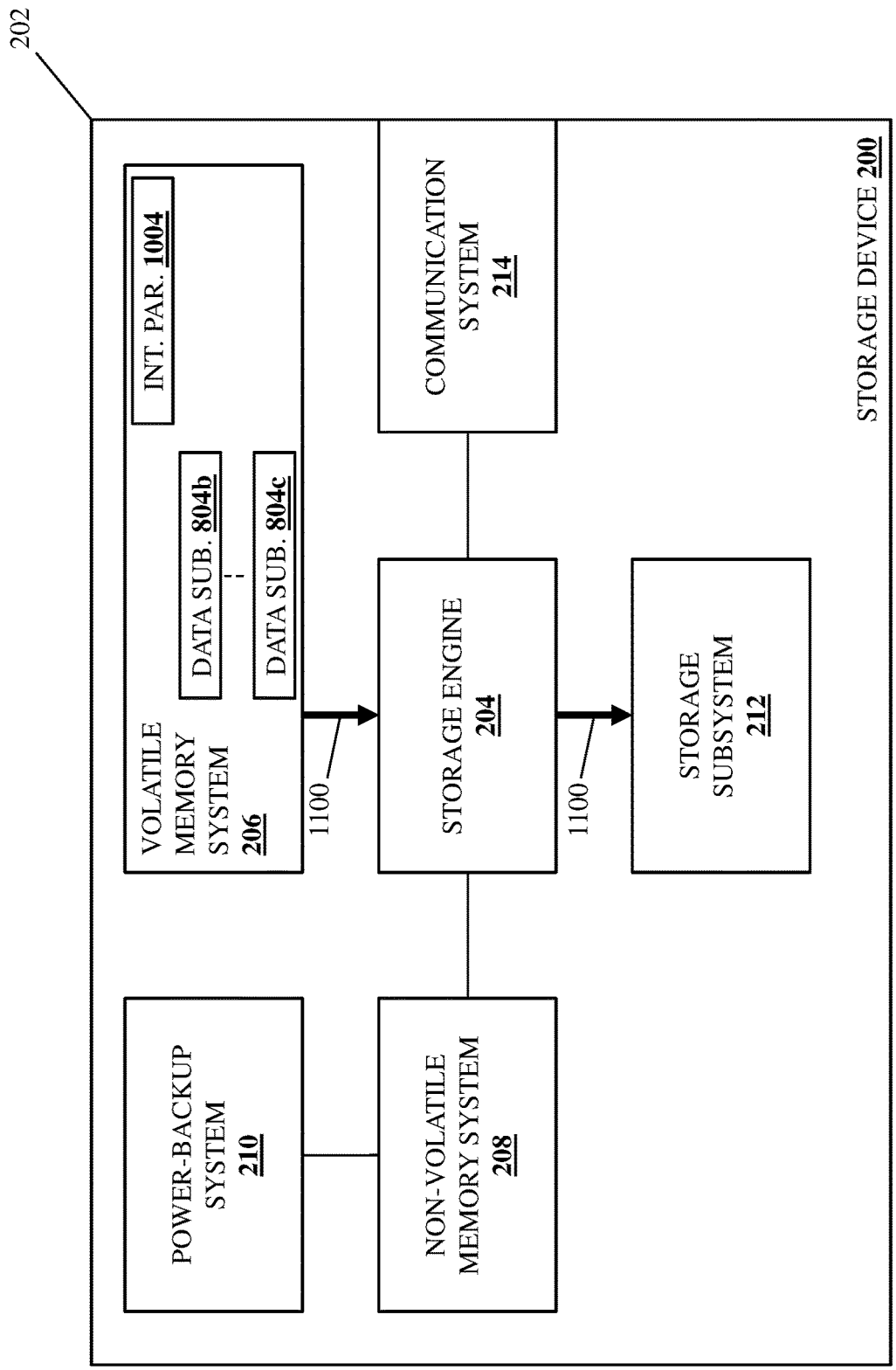
FIG. 11A is a schematic view illustrating an embodiment of the operations of the storage device in FIG. 9 according to the method of FIG. 6.

The method 600 then returns to block 604. With reference to FIG. 11A, in an embodiment of a second iteration of block 604, the storage engine 204 in the storage device 200 may perform storage subsystem data storage operations 1100 that include retrieving a subset of the primary data stored in the volatile memory system 206 (e.g., the data subset 804b of the data 804 in this second iteration of block 604), and writing or otherwise storing that subset of the primary data in the storage subsystem 212.

Figure 11B:
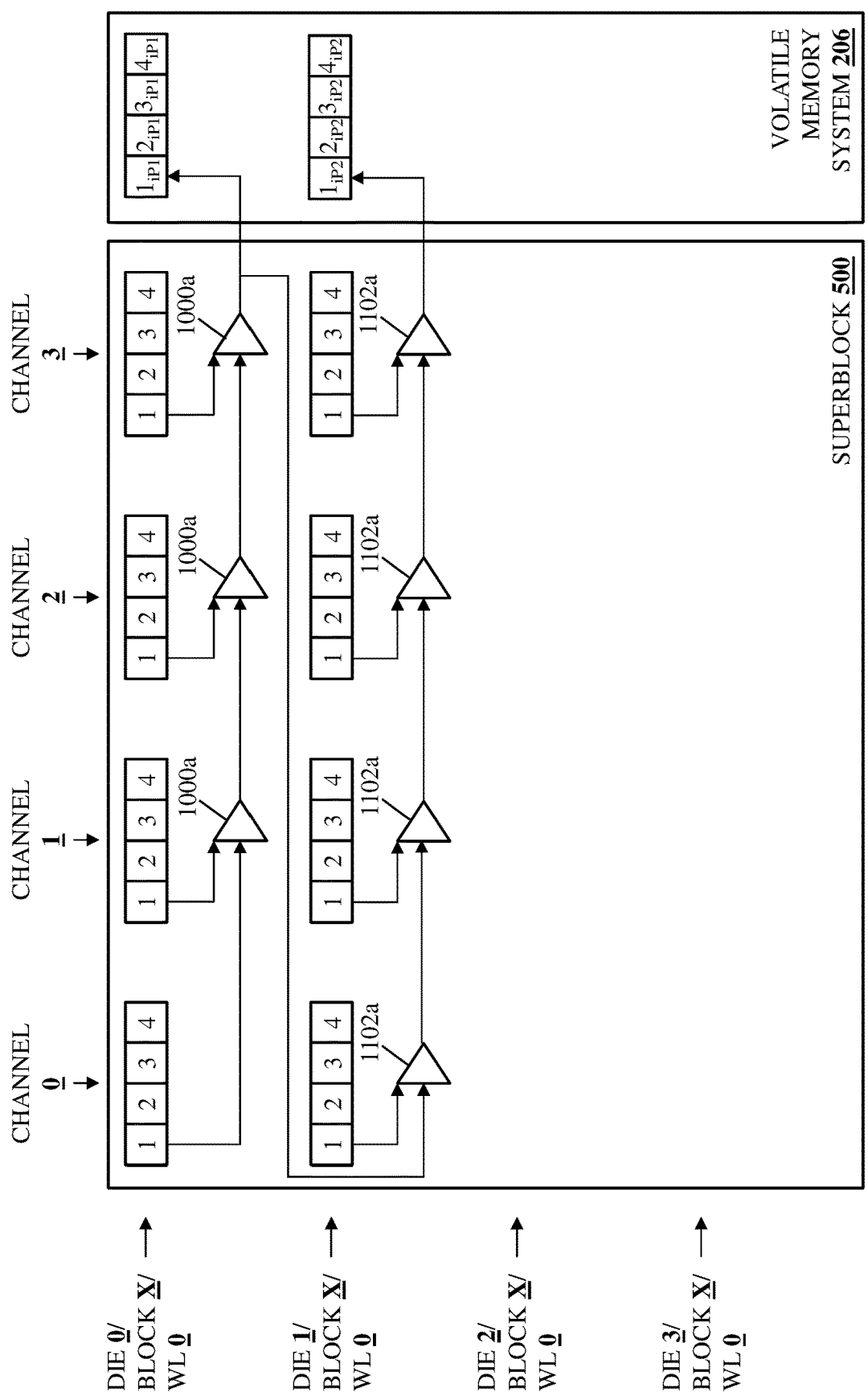
FIG. 11B is a schematic view illustrating an embodiment of the storage device of FIG. 2 operating according to the method of FIG. 6.

For example, with reference to FIG. 11B, an embodiment of the storage subsystem data storage operations 1100 to write the data subset 804b to the superblock 500 discussed above is illustrated. With reference back to FIGS. 4 and 5, in a second iteration of block 604 of the method 600 and as part of the storage subsystem data storage operations 1100, the storage engine 204 in the storage device 200 may have logically segmented the data 804 such that the data segment 804b will fit in the wordlines 508a, 510a, 512a, and 514a in the blocks 408a, 410a, 412a, and 414a, and may write that data segment to those wordlines in the second iteration of block 604 of the method 600. As such, with reference to FIG. 11B, the storage subsystem data storage operations 1100 may include writing, in a second iteration of block 604 of the method 600, a first portion of data subset 804b to segment 1 in the die 1/channel 0 combination, a second portion of the data subset 804b to segment 1 in the die 1/channel 1 combination, a third portion of the data subset 804b to segment 1 in the die 1/channel 2 combination, and a fourth portion of the data subset 804b to segment 1 in the die 1/channel 3 combination.

Figure 11C:
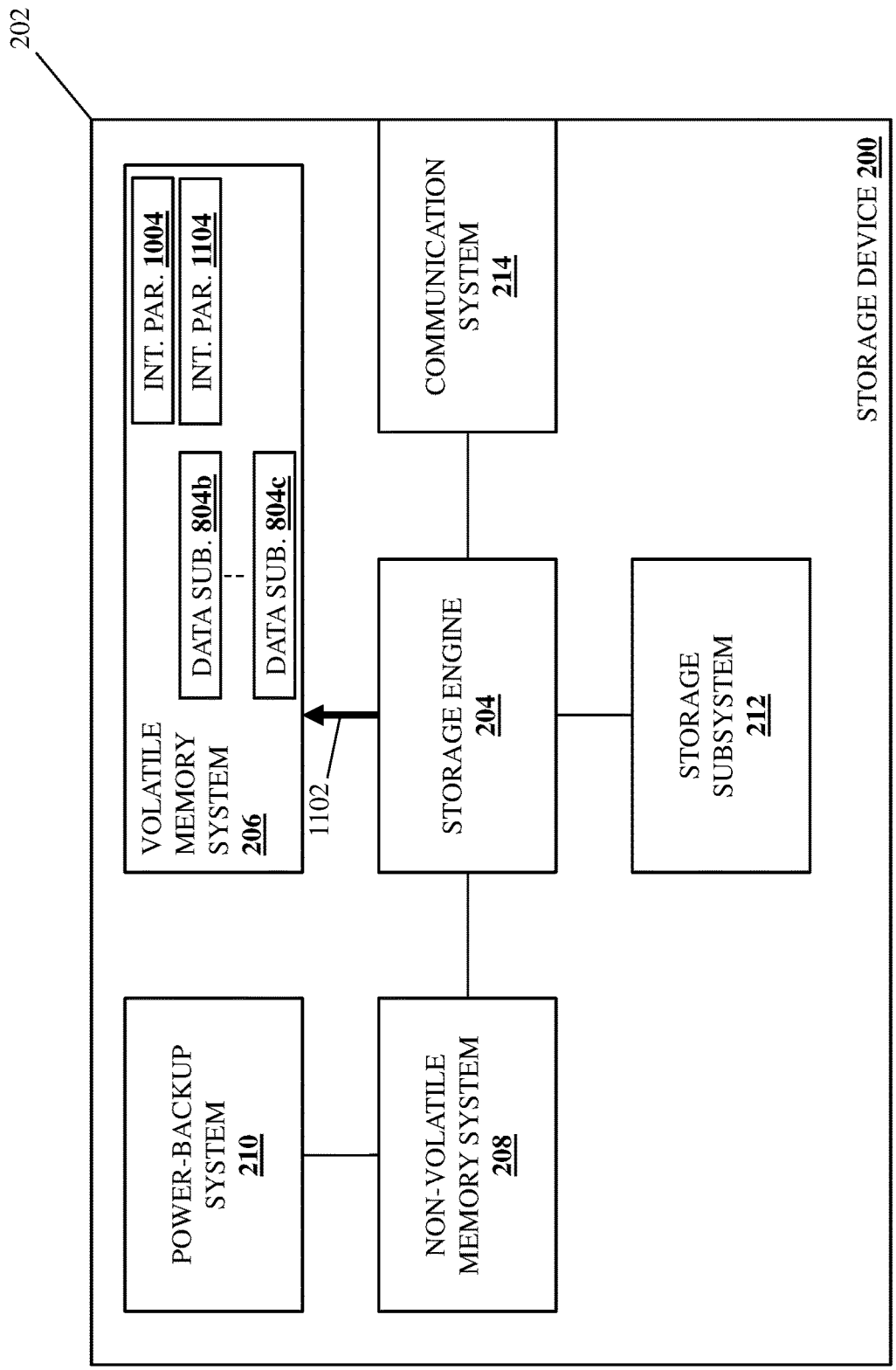
FIG. 11C is a schematic view illustrating an embodiment of the storage device of FIG. 2 operating according to the method of FIG. 6.

The method 600 then proceeds to decision block 606 where the method 600 again proceeds depending on whether all the primary data has been stored in the storage subsystem. As will be appreciated by one of skill in the art in possession of the present disclosure, in this example and at decision block 606, all the primary data has not been stored in the storage subsystem, and the method 600 proceeds to block 608 where the storage device generates intermediate parity data and stores the intermediate parity data in the volatile memory system. With reference to FIGS. 11B and 11C, in an embodiment of block 608 and following the second iteration of block 604 of the method 600 discussed above, the storage engine 204 in the storage device 200 may also perform intermediate parity data generation and storage operations 1102 that may include generating intermediate parity data (illustrated by intermediate parity generation operation elements 1102a in FIG. 11B) for the data subset 804b written to the segments 1 in the die 1/channel 0-3 combinations as discussed above, and then writing that intermediate parity data 1104 (e.g., as "segment $1_{iP2}$" in FIG. 11B) in the volatile memory system 206. As will be appreciated by one of skill in the art in possession of the present disclosure, the intermediate parity data generated for the data subset 804b may generated based on the intermediate parity data 1004 (e.g., which was written as "segment $1_{iP1}$" in the volatile memory system 206) and the data subset 804b written to the segments 1 in the die 1/channel 0-3 combinations.

Figure 11D:
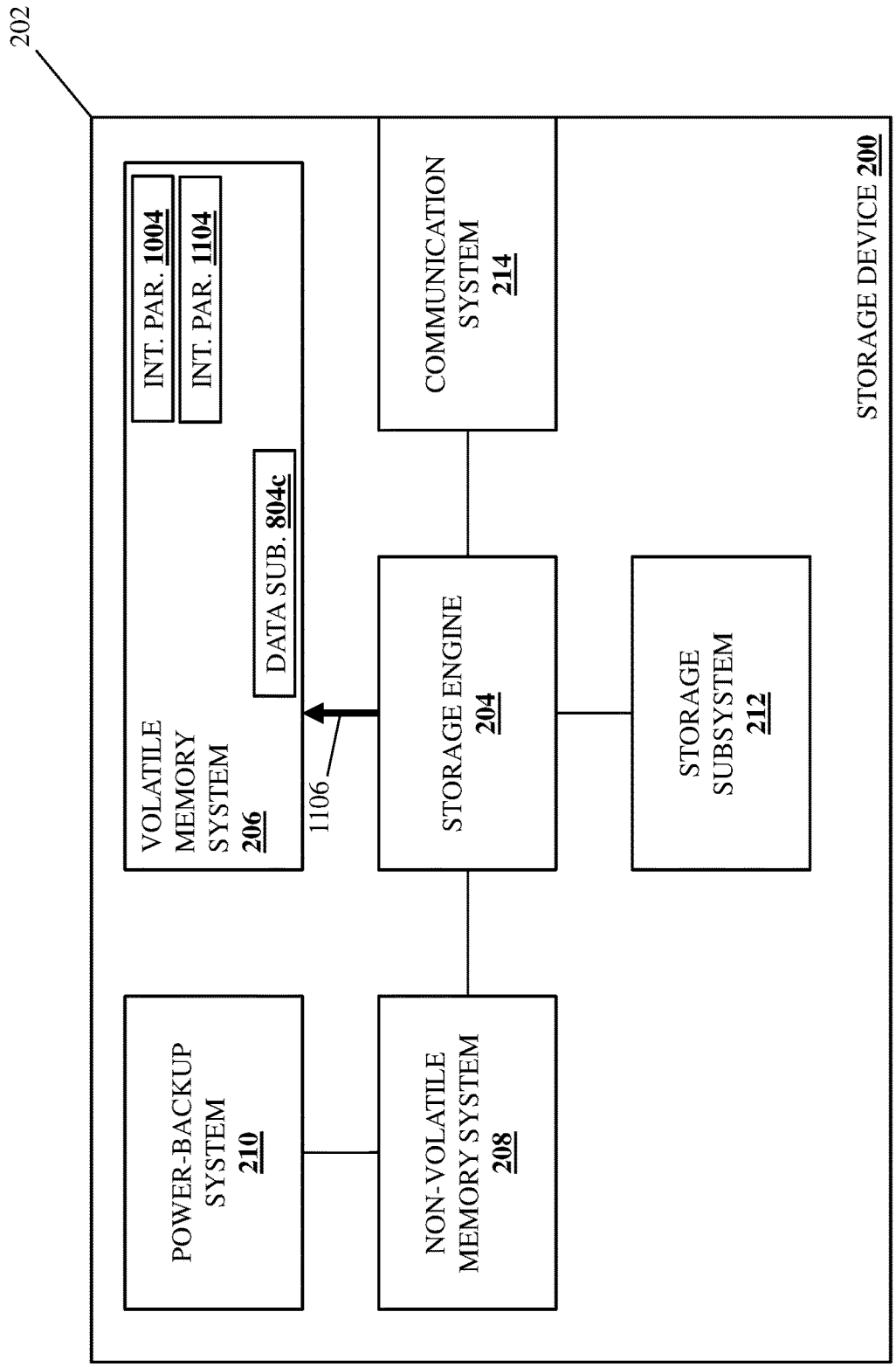
FIG. 11D is a schematic view illustrating an embodiment of the storage device of FIG. 2 operating according to the method of FIG. 6.

The method 600 then proceeds to block 610 where the storage device erases the subset of the primary data from the volatile memory system. With reference to FIG. 11D, in an embodiment of block 610, the storage engine 204 in the storage device 200 may perform data subset erasure operations 1006 that include erasing the data subset 804b from the volatile memory system 206. As will be appreciated by one of skill in the art in possession of the present disclosure, the erasure of the data subset 804b from the volatile memory system 206 frees of resources of the volatile memory system 206 that may be utilized to store other data. As such, the host system discussed above may provide first primary data that includes the data subsets 804a and 804b, and erasure of the data subsets 804a and 804b from the volatile memory system 206 may allow second primary data (which is different than the first primary data) provided by the host system to be stored in the volatile memory system 206 along with the data subset(s) up to 804c of the first primary data.

As such, one of skill in the art in possession of the present disclosure will appreciate how the method 600 may loop through blocks 604, 606, 608, and 610 as long as all of the primary data (e.g., the data 804 in the example above) has not been stored in the storage subsystem 212 such that subsets of that primary data are stored in the storage subsystem, intermediate parity data is generated for those subsets of primary data and is stored in the volatile memory system 206, and those subsets of primary data are erased from the volatile memory system 206. For example, FIG. 12A illustrates how a third iteration of block 604 of the method 600 may include writing a first portion of a data subset of the data 804 to segment 1 in the die 2/channel 0 combination, a second portion of that data subset of the data 804 to segment 1 in the die 2/channel 1 combination, a third portion of that data subset of the data 804 to segment 1 in the die 2/channel 2 combination, and a fourth portion of that data subset of the data 804 to segment 1 in the die 2/channel 3 combination.

Figure 12A:
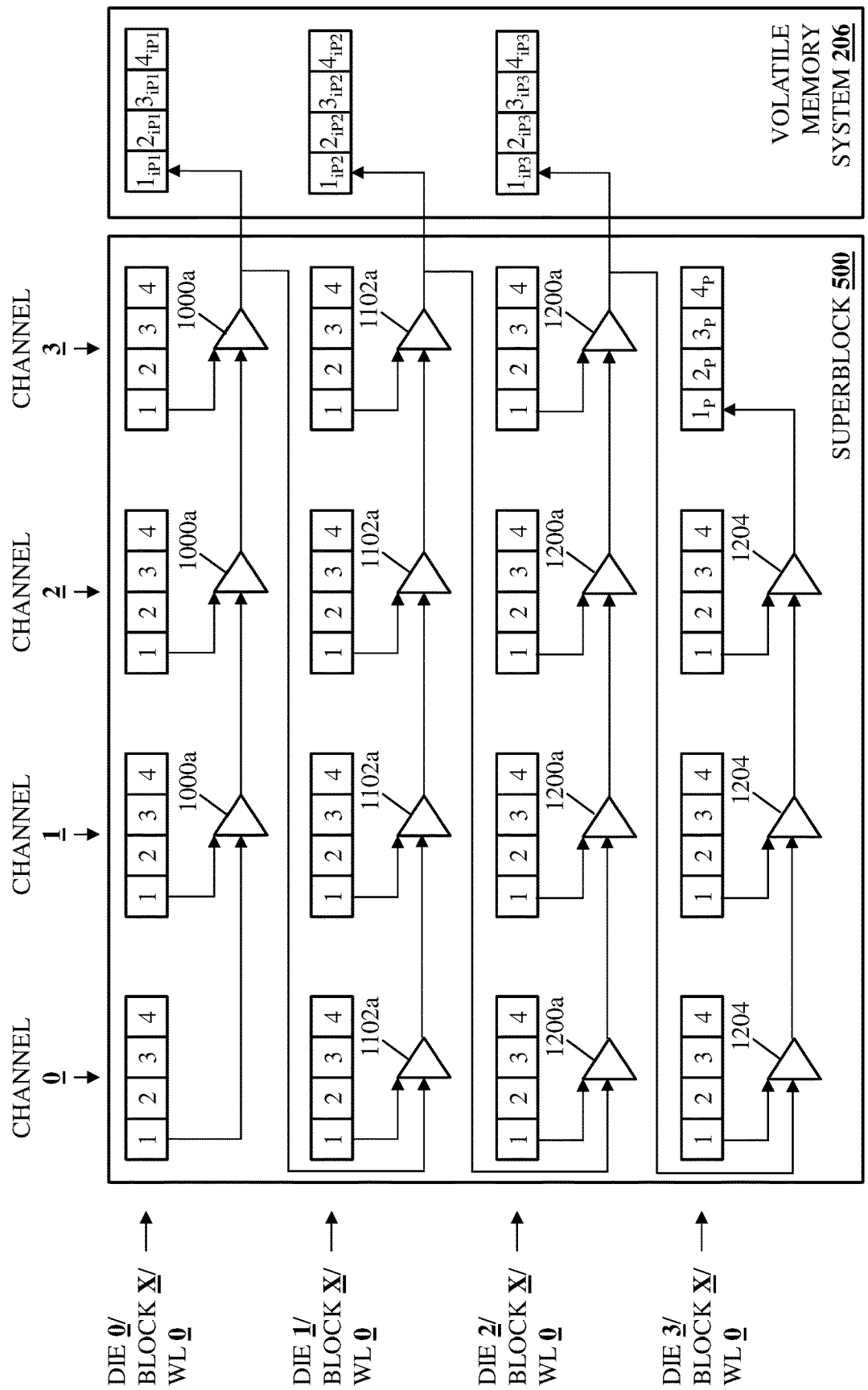
FIG. 12A is a schematic view illustrating an embodiment of the operations of the storage device in FIG. 2 according to the method of FIG. 6.
Figure 12B:
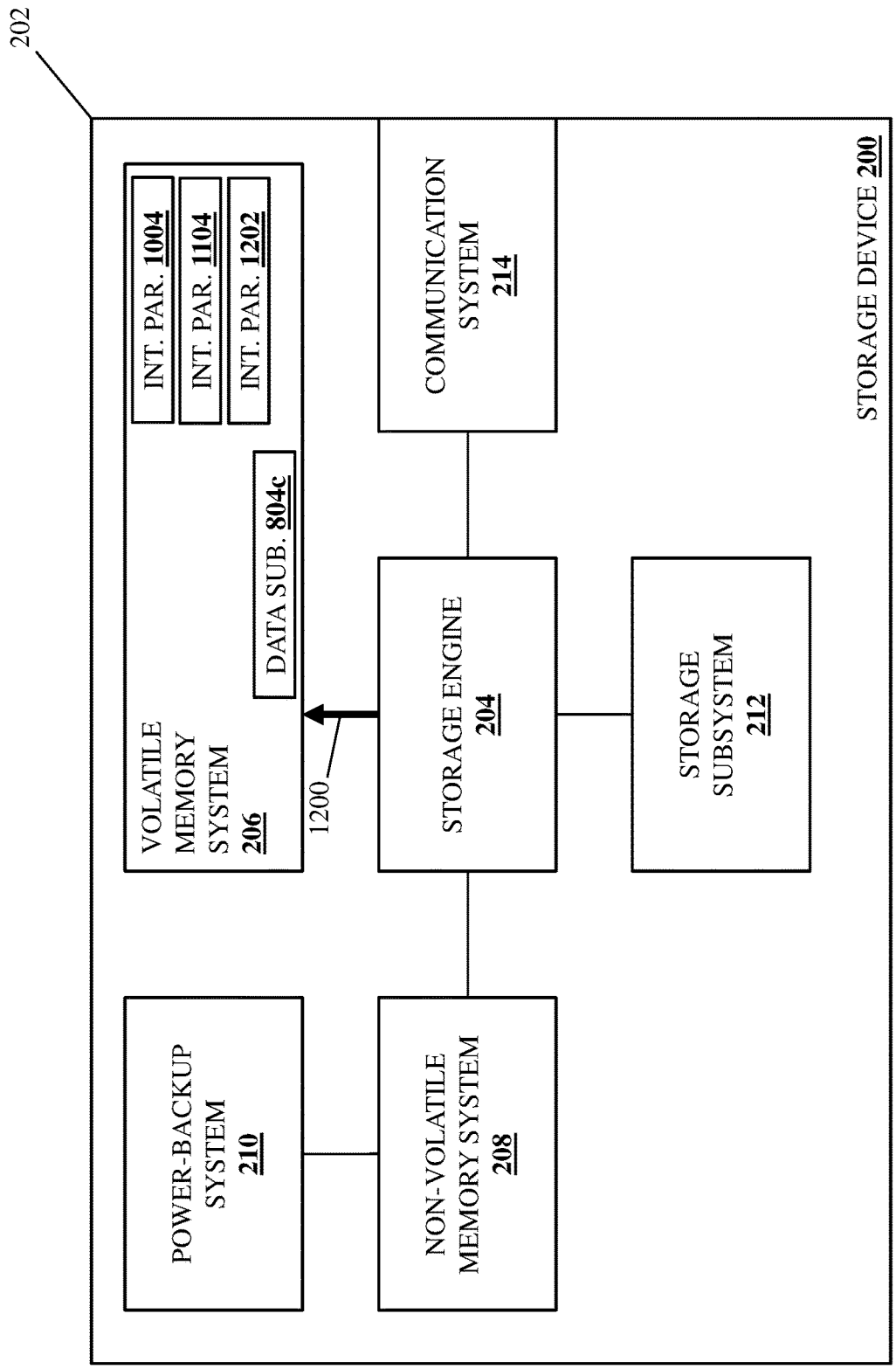
FIG. 12B is a schematic view illustrating an embodiment of the operations of the storage device in FIG. 2 according to the method of FIG. 6.

FIGS. 12A and 12B also illustrate how, following the third iteration of block 604 of the method 600 discussed above, the storage engine 204 in the storage device 200 may also perform intermediate parity data generation and storage operations 1200 that may include generating intermediate parity data (illustrated by intermediate parity generation operation elements 1200a in FIG. 12A) for the data subset of the data 804 written to the segments 1 in the die 2/channel 0-3 combinations as discussed above, and then writing that intermediate parity data 1202 (e.g., as "segment l$_{IPS}$" in FIG. 12A) in the volatile memory system 206. As will be appreciated by one of skill in the art in possession of the present disclosure, the intermediate parity data 1202 generated for the data subset of the data 804 written to the segments 1 in the die 2/channel 0-3 combinations may generated based on the intermediate parity data 1104 (e.g., which was written as "segment $1_{iP2}$" in the volatile memory system 206) and the data subset of the data 804 written to the segments 1 in the die 2/channel 0-3 combinations.

While not explicitly illustrated, one of skill in the art in possession of the present disclosure will appreciate how, subsequent to the storage of the intermediate parity data 1202 in the volatile memory system 206, the data subset of the data 804 upon which that intermediate parity data 1202 is based may be erased from the volatile memory system 206 to free up resources of the volatile memory system 206 similarly as described above. Similarly, FIG. 12A also illustrates how a fourth iteration of block 604 of the method 600 may include writing a first portion of the data subset 804c to segment 1 in the die 3/channel 0 combination, a second portion of the data subset 804c to segment 1 in the die 3/channel 1 combination, and a third portion of the data subset 804c to segment 1 in the die 3/channel 2 combination.

Figure 12C:
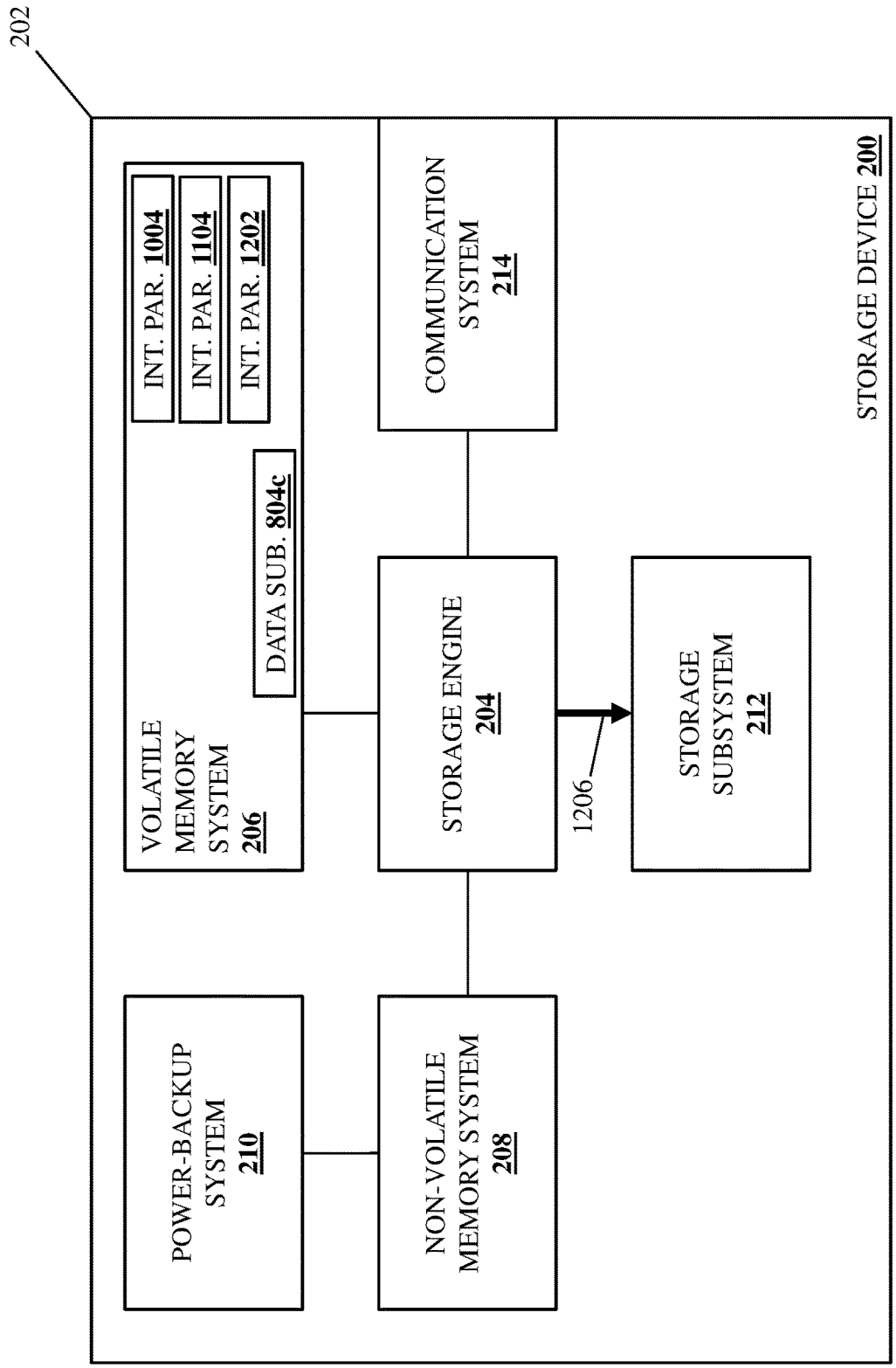
FIG. 12C is a schematic view illustrating an embodiment of the operations of the storage device in FIG. 2 according to the method of FIG. 6.

As will be appreciated by one of skill in the art in possession of the present disclosure, in the example provided above and following the fourth iteration of block 604 of the method 600 and at decision block 606, all the primary data 804 has been stored in the storage subsystem, and the method 600 proceeds to block 612 where the storage device generates final parity data and stores the final parity data in the storage subsystem. FIGS. 12A and 12C illustrate how, in an embodiment of block 612, the storage engine 204 in the storage device 200 may perform final parity data generation operations that may include generating final parity data (illustrated by final parity generation operation elements 1204 in FIG. 12A) for the data subset 804c written to the segments 1 in the die 3/channel 0-2 combinations as discussed above, and then performing final parity data storage operations 1206 that include writing that final parity data (e.g., as "segment $1_P$" in FIG. 12A) in the storage system 212. As will be appreciated by one of skill in the art in possession of the present disclosure, the final parity data generated for the data subset 804c may generated based on the intermediate parity data 1202 (e.g., which was written as "segment l$_{IPS}$" in the volatile memory system 206) and the data subset 804c written to the segments 1 in the die 3/channel 0-2 combinations.

Figure 13:
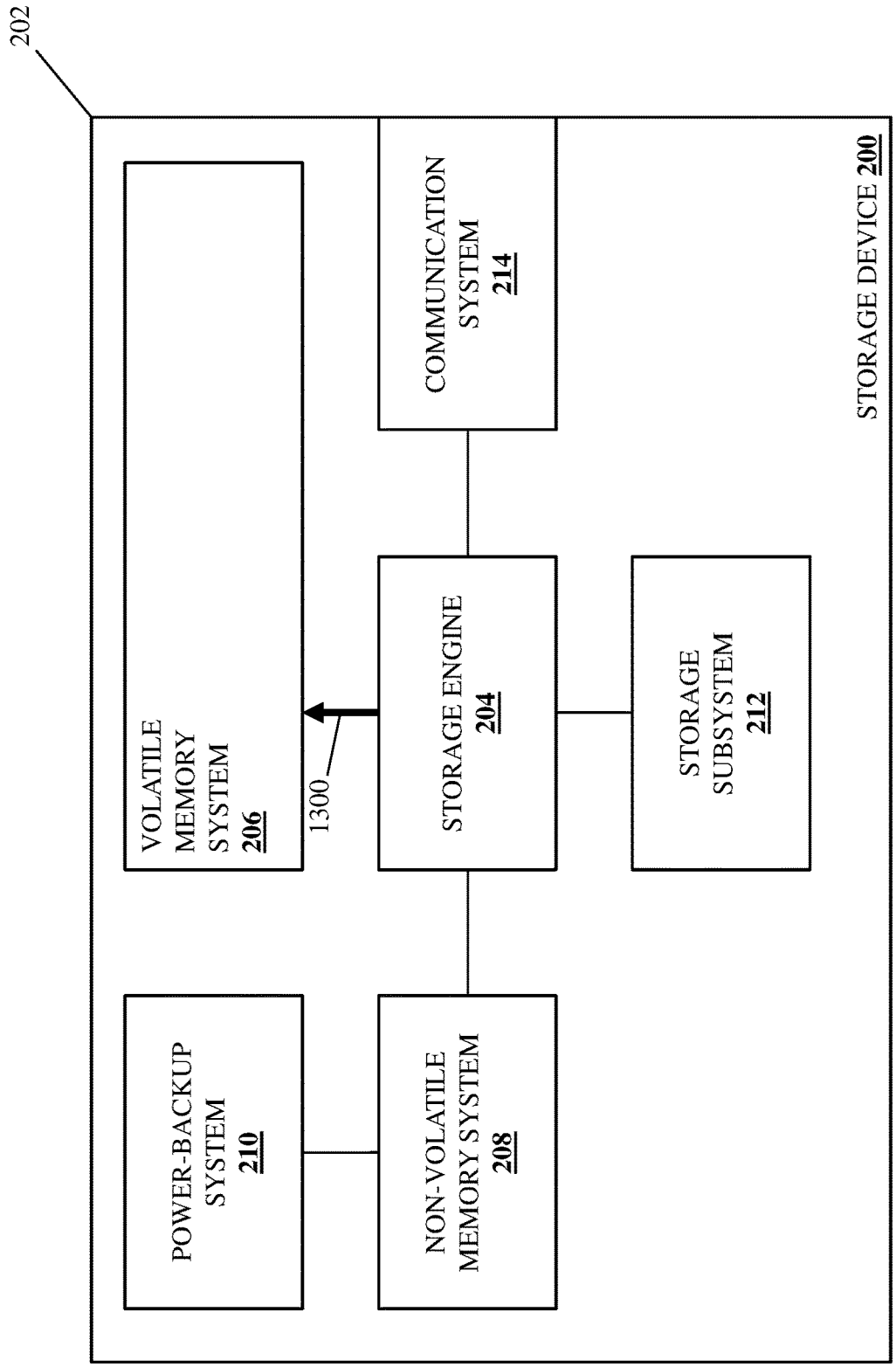
FIG. 13 is a schematic view illustrating an embodiment of the storage device of FIG. 2 operating according to the method of FIG. 6.

The method 600 then proceeds to block 614 where the storage device erases the subset of the primary data and the intermediate parity data from the volatile memory system. With reference to FIG. 13, in an embodiment of block 614, the storage engine 204 in the storage device 200 may perform primary data and intermediate parity data erasure operations 1300 that include erasing the data subset 804c and the intermediate parity data 1004, 1104, and 1202 from the volatile memory system 206. As discussed above, while the method 600 has been described to provide an example of the receiving of "first" primary data and storing it in the storage subsystem, similar operations may be performed to store "second" primary data, "third" primary data, and additional primary data received following the receiving of the "first" primary data. Furthermore, as also described above, as resources of the volatile memory system 206 are released (e.g., due to the erasure of the subsets of the "first" primary data and, eventually, the intermediate parity data), at least some of that "second" primary data, "third" primary data, and/or additional primary data may stored in the volatile memory system 206 along with any portion of the "first" primary data that may remain stored in the volatile memory system 206.

Figure 14:
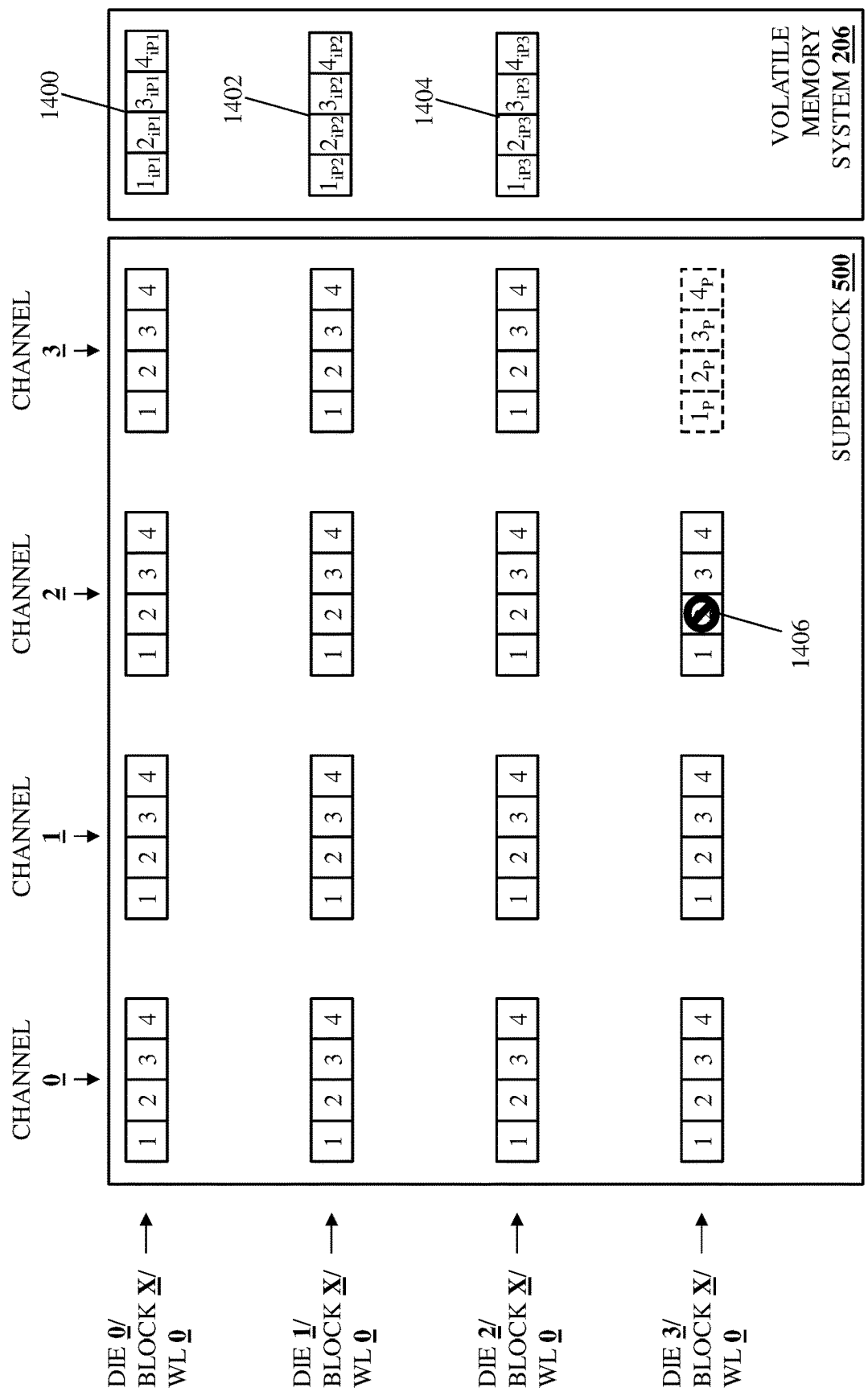
FIG. 14 is a schematic view illustrating an embodiment of the operation of the storage device of FIG. 2 using primary data and intermediate parity data stored according to the method of FIG. 6.

As discussed above, any of the intermediate parity data generated for subsets of data may be utilized to reconstruct a portion of that subset of data in the event that portion of the subset of the data is unrecoverable from its storage location. For example, FIG. 14 illustrates a scenario in which respective portions of a first subset of primary data have been written to the die 0/channel 0-3 combinations and corresponding first intermediate parity data 1400 has been written to the volatile storage system 206, respective portions of a second subset of the primary data have been written to the die 1/channel 0-3 combinations and corresponding second intermediate parity data 1402 has been written to the volatile storage system 206, and respective portions of a third subset of the primary data have been written to the die 2/channel 0-3 combinations and corresponding third intermediate parity data 1404 has been written to the volatile storage system 206. Furthermore, in this scenario and during the writing of respective portions of a fourth subset of the primary data to the die 3/channel 0-2 combinations, a data write failure (illustrated by element 1400 in FIG. 14) occurs when writing segment 3 in the die 3/channel 2 combination (e.g., such that the final parity data cannot be written to the die 3/channel 3 combination, as illustrated by the dashed lines in FIG. 14).

As will be appreciated by one of skill in the art in possession of the present disclosure, in the scenario discussed above the first subset, the second subset, and the third subset of the primary data is stored in the storage subsystem 212, while the fourth subset of the primary data that was being written to the die 3/channel 0-2 combinations when the data write failure occurred is stored in the volatile memory system 206. As such, the first subset, the second subset, the third subset, and the fourth subset of the primary data may be read from those storage locations and written to a different location (e.g., a different superblock) in the storage subsystem 212. However, in the event a portion of the first subset, the second subset, or the third subset of the primary data in unrecoverable from its storage location, it may be reconstructed using the intermediate parity data 1400, 1402, and/or 1404.

Figure 15:
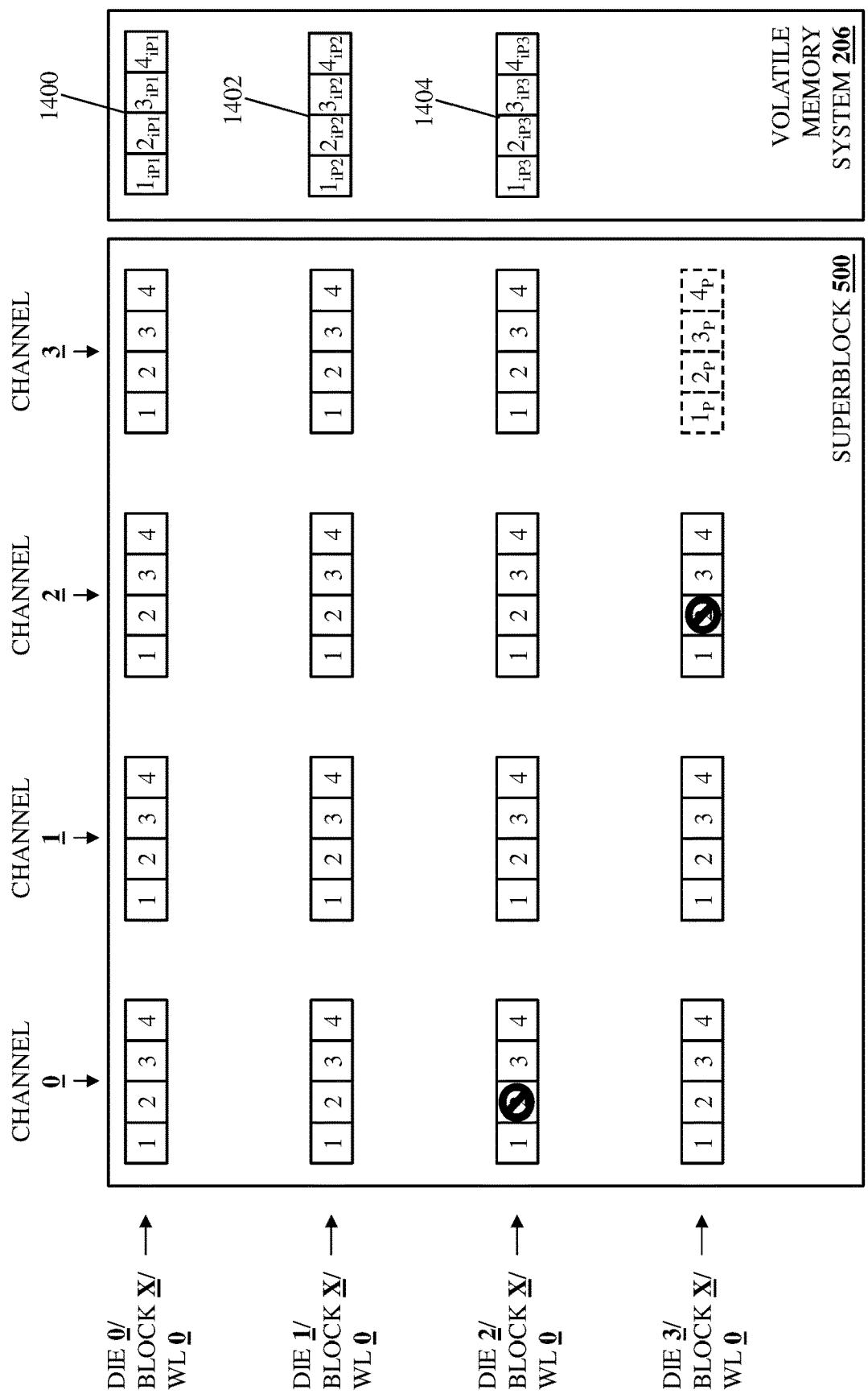
FIG. 15 is a schematic view illustrating an embodiment of the operation of the storage device of FIG. 2 using primary data and intermediate parity data stored according to the method of FIG. 6.

For example, FIG. 15 illustrates the scenario described for FIG. 14 above when the portion of the primary data stored in segment 2 of the die 2/channel 0 combination is unrecoverable from the storage subsystem 212. As will be appreciated by one of skill in the art in possession of the present disclosure, in such a scenario, the storage engine 204 in the storage device 200 may utilize the intermediate parity data 1402 and 1404 (e.g., segments $2_{ip2}$ and $2_{ip3}$), along with the segments 2 storing the third subset of the primary data that was written to the die 2, channel 1-3 combinations, in order to reconstruct the portion of the primary data that is unrecoverable from segment 2 of the die 2/channel 0 combination.

Figure 16:
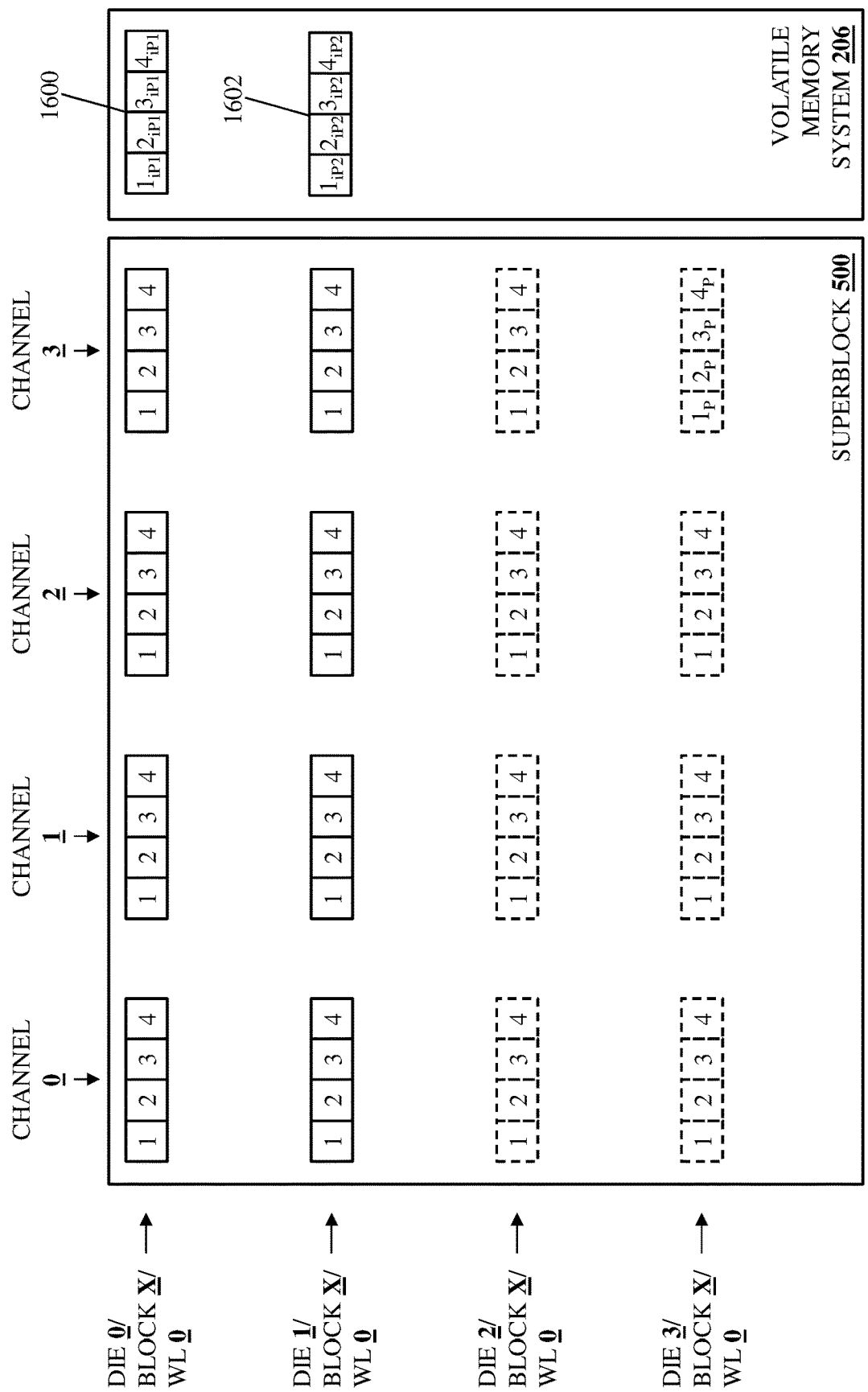
FIG. 16 is a schematic view illustrating an embodiment of the operation of the storage device of FIG. 2 using primary data and intermediate parity data stored according to the method of FIG. 6.

In another example, FIG. 16 illustrates a scenario in which respective portions of a first subset of primary data have been written to the die 0/channel 0-3 combinations and corresponding first intermediate parity data 1600 has been written to the volatile storage system 206, and respective portions of a second subset of the primary data have been written to the die 1/channel 0-3 combinations and corresponding second intermediate parity data 1602 has been written to the volatile storage system 206. Furthermore, in this scenario and during the writing of respective portions of a third subset of the primary data to the die 2/channel 0-3 combinations, a power failure occurs such that the third subset of the primary data cannot be written to the die 2/channel 0-3 combinations and the fourth subset of the primary data cannot be written to the die 3/channel 0-2 combinations (as illustrated by the dashed lines in FIG. 16). In such a situation, the intermediate parity data 1600 and 1602 stored in the volatile memory system 206, as well as the third subset and fourth subset of the primary data stored in the volatile memory system 206, will be copied to the non-volatile memory system 208 with the power backup system 210. As such, when power failure is remedied and power is once again available, the intermediate parity data 1600 and 1602 and the third subset and fourth subset of the primary data stored in the non-volatile memory system 208 may be copied back to the volatile memory system 206, and operations may be restarted to the primary data in a new/different superblock in the storage subsystem 212. However, in the event a portion of the first subset or the second subset of the primary data in unrecoverable from its storage location, it may be reconstructed using the intermediate parity data 1600 and/or 1602.

Figure 17:
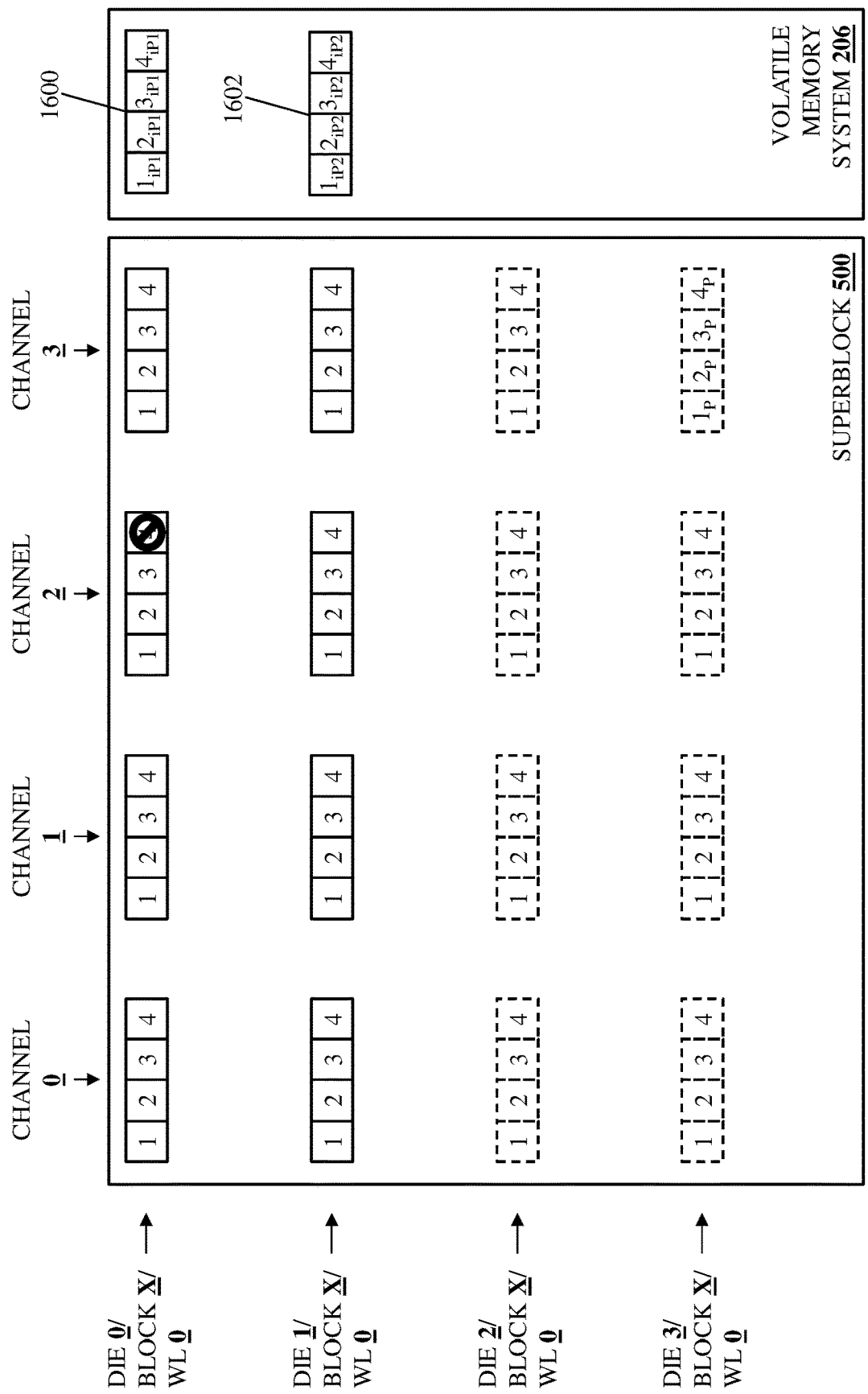
FIG. 17 is a schematic view illustrating an embodiment of the operation of the storage device of FIG. 2 using primary data and intermediate parity data stored according to the method of FIG. 6.

For example, FIG. 17 illustrates the scenario described for FIG. 16 above when the portion of the primary data that was stored in segment 4 of the die 0/channel 2 combination is unrecoverable from the storage subsystem 212. As will be appreciated by one of skill in the art in possession of the present disclosure, in such a scenario, the storage engine 204 in the storage device 200 may utilize the intermediate parity data 1600 (e.g., segment $1_{ip1}$), along with the segments 4 in the first subset of the primary data that was written to the die 0, channel 0, 1, and 3 combinations, in order to reconstruct the segment 4 of the die 0/channel 2 combination. However, while a few specific intermediate parity unrecoverable data reconstruction scenarios have been illustrated and described, one of skill in the art in possession of the present disclosure will appreciate how the intermediate parity data of the present disclosure may be utilized to reconstruct unrecoverable data in a variety of scenarios that will fall within the scope of the present disclosure as well.

Thus, systems and methods have been described that provide for the generation of respective intermediate parity data for subsets of primary data being stored in a storage subsystem, and the erasure of corresponding subsets of the primary data from a volatile memory system following the storage of their respective intermediate parity data in the volatile memory system, with the respective intermediate parity data used to reconstruct portions of its corresponding subset of primary data in the event it becomes unrecoverable. For example, the storage device RAID data write intermediate parity system includes a storage device coupled to a host system and including a storage subsystem and a volatile memory system. The storage device RAID data write intermediate parity system receives first primary data from the host system, and stores the first primary data in the volatile memory system. The storage device RAID data write intermediate parity system then stores a first subset of the first primary data in the storage system, generates first intermediate parity data using the first subset of the first primary data, stores the first intermediate parity data in the volatile memory system and, in response, erases the first subset of the first primary data from the volatile memory system.

As will be appreciated by one of skill in the art in possession of the present disclosure, the release of volatile memory system resources as primary data is written to a storage subsystem will reduce performance issues such as those that produce the "excursions", reduced QoS, and other issues in storage device write performance discussed above, and reduce storage device cost by reducing the need for larger volatile memory systems and associated power backup subsystem required for non-volatile memory system used to back up the volatile memory system, as well as reducing the frequency of charging of the power backup subsystem to reduced power consumption by the storage device. One of skill in the art in possession of the present disclosure will appreciate how such the advantages discussed above may be particularly beneficial in storage devices such as the NVMe ZNS SSD storage devices discussed above that may process primary data for multiple RAID frames in parallel.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage device Redundant Array of Independent Disk (RAID) data write intermediate parity system, comprising:
   a host system; and
   a storage device that is coupled to the host system, that includes storage subsystem and a volatile memory system, and that is configured to:
   receive, from the host system, first primary data;
   store the first primary data in the volatile memory system;
   store a first subset of the first primary data in the storage system;
   generate first intermediate parity data using the first subset of the first primary data;
   store the first intermediate parity data in the volatile memory system;
   erase, in response to storing the first subset of the first primary data in the storage system and storing the first intermediate parity data in the volatile memory system, the first subset of the first primary data from the volatile memory system;
   store, subsequent to erasing the first subset of the first primary data from the volatile memory system, a second subset of the first primary data in the storage system;
   generate second intermediate parity data using the second subset of the first primary data;
   store the second intermediate parity data in the volatile memory system; and
   erase, in response to storing the second subset of the first primary data in the storage system and storing the second intermediate parity data in the volatile memory system, the second subset of the first primary data from the volatile memory system.

2. The system of claim 1, wherein the storage device is configured to:
   store, subsequent to erasing the second subset of the first primary data from the volatile memory system, a plurality of third subsets of the first primary data in the storage system and, for each third subset of the first primary data stored in the storage subsystem:
   generate third intermediate parity data using that third subset of the first primary data;

store the third intermediate parity data generated using that third subset of the first primary data in the volatile memory system; and erase, in response to storing that third subset of the first primary data in the storage system and storing that third intermediate parity data generated using that third subset of the first primary data in the volatile memory system, that third subset of the first primary data from the volatile memory system.

3. The system of claim 1, wherein the storage device is configured to:

store, subsequent to erasing the second subset of the first primary data from the volatile memory system, a final subset of the first primary data in the storage system;

generate final parity data using the final subset of the first primary data;

store the final parity data in the storage system; and erase, in response to storing the final subset of the first primary data and the final parity data in the storage system, the final subset of the first primary data, the first intermediate parity data, and the second intermediate parity data from the volatile memory system.

4. The system of claim 1, wherein the storage device is configured to:

receive, from the host system, second primary data; and store, subsequent to erasing the first subset of the first primary data from the volatile memory system, at least a portion of the second primary data in the volatile memory system along with the second subset of the first primary data.

5. The system of claim 1, wherein the storage device is configured to:

determine that a storage operation to store a third subset of the first primary data in the storage subsystem has failed;

determine that a first portion of the first subset of the first primary data stored in the storage subsystem is unrecoverable; and use the first intermediate parity data stored in the volatile memory system to recover the first portion of the first subset of the first primary data.

6. The system of claim 1, wherein the storage device is configured to:

detect a power loss during a storage operation to store a third subset of the first primary data in the storage subsystem;

store, in response to detecting the power loss, the first intermediate parity data and the second intermediate parity data in a non-volatile memory system;

determine, in response to power becoming available subsequent to detecting the power loss, that a first portion of the first subset of the first primary data stored in the storage subsystem is unrecoverable; and use the first intermediate parity data stored in the non-volatile memory system to recover the first portion of the first subset of the first primary data.

7. An Information Handling System (IHS), comprising:

a processing system; and a memory system that is coupled to the processing system and that includes instructions that, when executed by the processing system, cause the processing system to provide a storage engine that is configured to:

receive, from a host system, first primary data;

store the first primary data in a volatile memory system;

store a first subset of the first primary data in a storage system;

generate first intermediate parity data using the first subset of the first primary data;

store the first intermediate parity data in the volatile memory system;

erase, in response to storing the first subset of the first primary data in the storage system and storing the first intermediate parity data in the volatile memory system, the first subset of the first primary data from the volatile memory system;

store, subsequent to erasing the first subset of the first primary data from the volatile memory system, a second subset of the first primary data in the storage system;

generate second intermediate parity data using the second subset of the first primary data;

store the second intermediate parity data in the volatile memory system; and erase, in response to storing the second subset of the first primary data in the storage system and storing the second intermediate parity data in the volatile memory system, the second subset of the first primary data from the volatile memory system.

8. The IHS of claim 7, wherein the storage engine is configured to:

store, subsequent to erasing the second subset of the first primary data from the volatile memory system, a plurality of third subsets of the first primary data in the storage system and, for each third subset of the first primary data stored in the storage subsystem:

generate third intermediate parity data using that third subset of the first primary data;

store the third intermediate parity data generated using that third subset of the first primary data in the volatile memory system; and erase, in response to storing that third subset of the first primary data in the storage system and storing that third intermediate parity data generated using that third subset of the first primary data in the volatile memory system, that third subset of the first primary data from the volatile memory system.

9. The IHS of claim 7, wherein the storage engine is configured to:

store, subsequent to erasing the second subset of the first primary data from the volatile memory system, a final subset of the first primary data in the storage system;

generate final parity data using the final subset of the first primary data;

store the final parity data in the storage system; and erase, in response to storing the final subset of the first primary data and the final parity data in the storage system, the final subset of the first primary data, the first intermediate parity data, and the second intermediate parity data from the volatile memory system.

10. The IHS of claim 7, wherein the storage engine is configured to:

receive, from the host system, second primary data; and store, subsequent to erasing the first subset of the first primary data from the volatile memory system, at least a portion of the second primary data in the volatile memory system along with the second subset of the first primary data.

11. The IHS of claim 7, wherein the storage engine is configured to:

determine that a storage operation to store a third subset of the first primary data in the storage subsystem has failed;

determine that a first portion of the first subset of the first primary data stored in the storage subsystem is unrecoverable; and use the first intermediate parity data stored in the volatile memory system to recover the first portion of the first subset of the first primary data.

12. The IHS of claim 7, wherein the storage engine is configured to:

detect a power loss during a storage operation to store a third subset of the first primary data in the storage subsystem; and store, in response to detecting the power loss, the first intermediate parity data and the second intermediate parity data in a non-volatile memory system.

13. The IHS of claim 12, wherein the storage engine is configured to:

determine, in response to power becoming available subsequent to detecting the power loss, that a first portion of the first subset of the first primary data stored in the storage subsystem is unrecoverable; and use the first intermediate parity data stored in the non-volatile memory system to recover the first portion of the first subset of the first primary data.

14. A method for performing intermediate parity Redundant Array of Independent Disk (RAID) data writes in a storage device, comprising:

receiving, by a storage device from a host system, first primary data;

storing, by the storage device, the first primary data in a volatile memory system;

storing, by the storage device, a first subset of the first primary data in a storage system;

generating, by the storage device, first intermediate parity data using the first subset of the first primary data;

storing, by the storage device, the first intermediate parity data in the volatile memory system;

erasing, by the storage device, in response to storing the first subset of the first primary data in the storage system and storing the first intermediate parity data in the volatile memory system, the first subset of the first primary data from the volatile memory system, storing, by the storage device subsequent to erasing the first subset of the first primary data from the volatile memory system, a second subset of the first primary data in the storage system;

generating, by the storage device, second intermediate parity data using the second subset of the first primary data;

storing, by the storage device, the second intermediate parity data in the volatile memory system; and erasing, by the storage device in response to storing the second subset of the first primary data in the storage system and storing the second intermediate parity data in the volatile memory system, the second subset of the first primary data from the volatile memory system.

15. The method of claim 14, further comprising:

storing, by the storage device subsequent to erasing the second subset of the first primary data from the volatile memory system, a plurality of third subsets of the first primary data in the storage system and, for each third subset of the first primary data stored in the storage subsystem:

generating, by the storage device, third intermediate parity data using that third subset of the first primary data;

storing, by the storage device, the third intermediate parity data generated using that third subset of the first primary data in the volatile memory system; and erasing, by the storage device in response to storing that third subset of the first primary data in the storage system and storing that third intermediate parity data generated using that third subset of the first primary data in the volatile memory system, that third subset of the first primary data from the volatile memory system.

16. The method of claim 15, further comprising:

storing, by the storage device subsequent to erasing the second subset of the first primary data from the volatile memory system, a final subset of the first primary data in the storage system;

generating, by the storage device, final parity data using the final subset of the first primary data;

storing, by the storage device, the final parity data in the storage system; and erasing, by the storage device in response to storing the final subset of the first primary data and the final parity data in the storage system, the final subset of the first primary data, the first intermediate parity data, and the second intermediate parity data from the volatile memory system.

17. The method of claim 14, further comprising:

receiving, by the storage device from the host system, second primary data; and storing, by the storage device subsequent to erasing the first subset of the first primary data from the volatile memory system, at least a portion of the second primary data in the volatile memory system along with the second subset of the first primary data.

18. The method of claim 14, further comprising:

determining, by the storage device, that a storage operation to store a third subset of the first primary data in the storage subsystem has failed;

determining, by the storage device, that a first portion of the first subset of the first primary data stored in the storage subsystem is unrecoverable; and using, by the storage device, the first intermediate parity data stored in the volatile memory system to recover the first portion of the first subset of the first primary data.

19. The method of claim 14, further comprising:

detecting, by the storage device, a power loss during a storage operation to store a third subset of the first primary data in the storage subsystem; and storing, by the storage device in response to detecting the power loss, the first intermediate parity data and the second intermediate parity data in a non-volatile memory system.

20. The method of claim 19, further comprising:

determining, by the storage device in response to power becoming available subsequent to detecting the power loss, that a first portion of the first subset of the first primary data stored in the storage subsystem is unrecoverable; and using, by the storage device, the first intermediate parity data stored in the non-volatile memory system to recover the first portion of the first subset of the first primary data.

* * * * *

UNITED STATES PATENT AND TRADEMARK OFFICE
CERTIFICATE OF CORRECTION

| | | |
|---|---|---|
| PATENT NO. | : 11,822,429 B2 | Page 1 of 1 |
| APPLICATION NO. | : 17/716204 | |
| DATED | : November 21, 2023 | |
| INVENTOR(S) | : Desai et al. | |

It is certified that error appears in the above-identified patent and that said Letters Patent is hereby corrected as shown below:

In the Specification

Column 1, Line 40, "RAIDS" should read -- RAID5 --;
Column 9, Line 47, "RAIDS" should read -- RAID5 --;
Column 10, Line 59, "RAIDS" should read -- RAID5 --.

In the Claims

Column 21, Line 41, Claim 14, "primary data from the volatile memory system," should be changed to -- primary data from the volatile memory system; --

Signed and Sealed this
Thirtieth Day of January, 2024

Katherine Kelly Vidal
*Director of the United States Patent and Trademark Office*